US009185733B2

(12) United States Patent
Noh et al.

(10) Patent No.: US 9,185,733 B2
(45) Date of Patent: Nov. 10, 2015

(54) METHOD OF DEVICE-TO-DEVICE COMMUNICATION IN WIRELESS MOBILE COMMUNICATION SYSTEM

(71) Applicant: Electronics and Telecommunications Research Institute, Daejeon (KR)

(72) Inventors: Tae Gyun Noh, Daejeon (KR); Kyoung Seok Lee, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 198 days.

(21) Appl. No.: 13/748,110

(22) Filed: Jan. 23, 2013

(65) Prior Publication Data

US 2014/0004867 A1    Jan. 2, 2014

(30) Foreign Application Priority Data

| Jan. 25, 2012 | (KR) | 10-2012-0007403 |
| Mar. 7, 2012 | (KR) | 10-2012-0023255 |
| May 16, 2012 | (KR) | 10-2012-0051849 |
| Aug. 30, 2012 | (KR) | 10-2012-0095549 |
| Jan. 23, 2013 | (KR) | 10-2013-0007519 |

(51) Int. Cl.
*H04W 72/00* (2009.01)
*H04W 76/02* (2009.01)
*H04W 72/04* (2009.01)
*H04W 24/10* (2009.01)

(52) U.S. Cl.
CPC ............ *H04W 76/023* (2013.01); *H04W 24/10* (2013.01); *H04W 72/04* (2013.01); *H04W 72/042* (2013.01)

(58) Field of Classification Search
CPC . H04W 76/02; H04W 36/0055; H04W 4/005; H04W 72/04; H04W 74/0808; H04W 76/023
USPC ......................................................... 455/450
See application file for complete search history.

(56) References Cited

U.S. PATENT DOCUMENTS

| 8,331,249 | B2 | 12/2012 | Li et al. | |
| 2010/0215011 | A1* | 8/2010 | Pan et al. | 370/329 |
| 2010/0261469 | A1 | 10/2010 | Ribeiro et al. | |
| 2011/0009124 | A1* | 1/2011 | Kostic | 455/450 |
| 2011/0212730 | A1* | 9/2011 | Wennstrom et al. | 455/450 |
| 2013/0051296 | A1* | 2/2013 | Park et al. | 370/311 |
| 2013/0122893 | A1* | 5/2013 | Turtinen et al. | 455/423 |
| 2013/0157669 | A1* | 6/2013 | Turtinen et al. | 455/450 |

FOREIGN PATENT DOCUMENTS

KR    10-2010-0040920    4/2010

* cited by examiner

*Primary Examiner* — Khalid Shaheed
(74) *Attorney, Agent, or Firm* — Nelson Mullins Riley & Scarborough LLP

(57) ABSTRACT

A device-to-device (D2D) communication method in a wireless mobile communication system is provided. A channel state measurement method for adaptive transmission of cellular network-based D2D communication, a data transmission/reception method of D2D communication, and a power control method for transmission power control of a D2D link in the D2D communication are provided. Specifically, cellular network-based D2D communication methods optimized for a Third Generation Partnership Project (3GPP) Long Term Evolution (LTE) system are provided. The above-described methods are also applicable to various cellular mobile communication systems as well as the 3GPP LTE system.

17 Claims, 10 Drawing Sheets

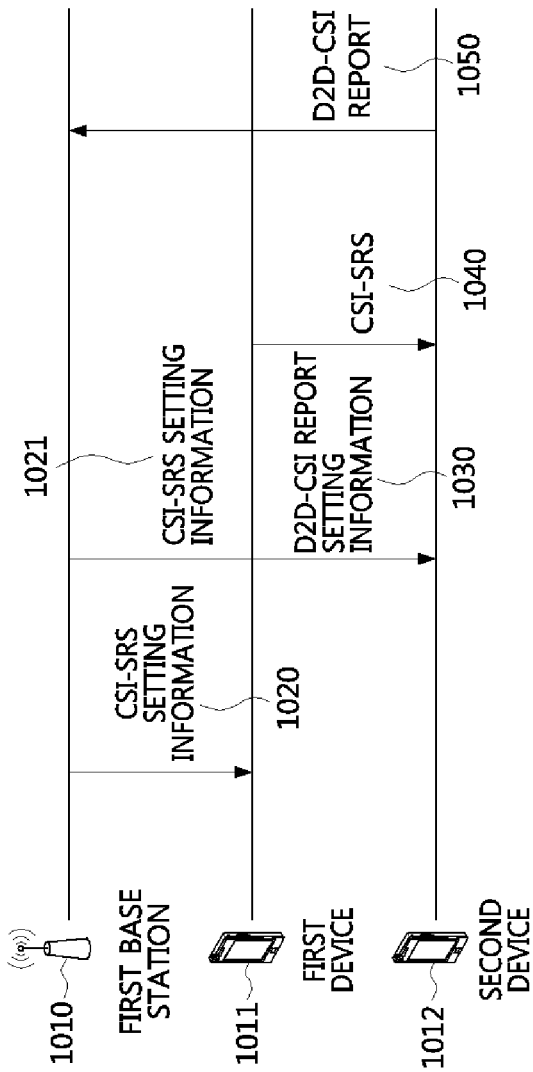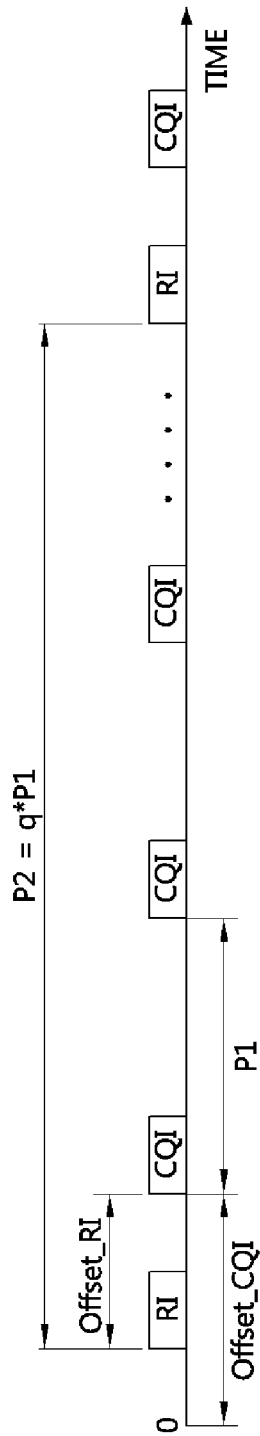

METHOD OF DEVICE-TO-DEVICE COMMUNICATION IN WIRELESS MOBILE COMMUNICATION SYSTEM

CLAIM FOR PRIORITY

This application claims priority to Korean Patent Application No. 10-2012-0007403 filed on Jan. 25, 2012, Korean Patent Application No. 10-2012-0023255 filed on Mar. 7, 2012, Korean Patent Application No. 10-2012-0051849 filed on May 16, 2012, Korean Patent Application No. 10-2012-0095549 filed on Aug. 30, 2012, and Korean Patent Application No. 10-2013-0007519 filed on Jan. 23, 2013 in the Korean Intellectual Property Office (KIPO), the entire contents of which are hereby incorporated by reference.

BACKGROUND

1. Technical Field

Example embodiments of the present invention relate in general to a device-to-device (D2D) communication method and more specifically to channel state measurement, data transmission/reception, and power control methods necessary to perform D2D communication in a cellular-based wireless mobile communication system.

2. Related Art

D2D communication is a communication scheme in which direct data transmission/reception is performed between two devices adjacent to each other without passing through a base station. That is, two devices, one of which serves as a data source and a data destination respectively, communicate with each other.

Various discussions may be made on use cases in which D2D communication may be efficiently used. For example, D2D communication may be used in a local media server that provides a large amount of data (for example, programs of a rock concert and information on a musician) to audience at a rock concert and the like.

At this time, while devices connected to a serving cell may perform telephone communication, Internet access, or the like using an existing cellular link, they directly transmit and receive the above-mentioned large amount of data from the local media server operating as a communication partner device of D2D communication according to a D2D scheme. On the other hand, a D2D link may be established between devices within different serving cells as well as between devices within the same serving cell.

A cellular network-based D2D communication scheme in the above-described D2D communication is a scheme in which a device desiring to communicate with another device requests a central node (a base station in a cellular network), which performs control, to establish a link, and the central node enables the device to perform D2D communication with a communication partner device by assigning radio resources for the D2D communication when the communication partner device is located around the device.

At this time, the overall operation of the device is managed by the central node, and radio resources assigned to a cellular link or another D2D link for the D2D communication may be reused.

Many advantages and disadvantages coexist in the communication of the existing cellular scheme of the related art and the above-described D2D communication. Accordingly, a communication system in which mobile communication of the cellular scheme is combined with the above-described D2D communication is ultimately expected to be widespread.

However, many technical parts such as adaptive transmission, scheduling, and power control of D2D communication necessary for performing the above-described D2D communication are not supported in the current cellular network.

SUMMARY

Accordingly, example embodiments of the present invention are provided to substantially obviate one or more problems due to limitations and disadvantages of the related art.

Example embodiments of the present invention provide a channel state measurement method of D2D communication, which includes a method of controlling transmission/reception of a sounding reference signal (SRS) for channel state measurement of a D2D link and a method of reporting channel state information (CSI) measured using the SRS, as a channel state measurement method for adaptive transmission of cellular network-based D2D communication.

Example embodiments of the present invention also provide a data transmission/reception method of D2D communication, which includes a method in which a base station provides scheduling assignment information for a D2D link to devices and the devices perform D2D communication based on the received scheduling assignment information and provide a feedback of reception success or failure, as a data transmission/reception method of cellular network-based D2D communication.

Example embodiments of the present invention also provide a power control method of D2D communication for transmission power control of a D2D link in cellular network-based D2D communication.

In some example embodiments, a method of measuring a channel state of a D2D link for D2D communication includes: receiving, by a first device, SRS reception setting information for measuring the channel state of the D2D link from a base station; generating CSI of the D2D link using an SRS received from a second device based on the SRS reception setting information; and reporting, by the first device, the CSI to the base station.

In other example embodiments, a method of measuring a channel state of a D2D link for D2D communication, includes: receiving, by a first device, SRS transmission setting information for measuring the channel state of the D2D link from a base station; transmitting, by the first device, an SRS to a second device based on the SRS transmission setting information; and measuring, by the first device, interference of the D2D link and reporting the measured interference to the base station.

In still other example embodiments, a data transmission/reception method of a first device for D2D communication includes: receiving activation reception assignment information of a first D2D link from a base station in a first subframe; transmitting whether the activation reception assignment information of the first D2D link has been successfully received to the base station in a second subframe after a predetermined number (m) of subframes from the first subframe; and receiving data of the first D2D link from a second device based on the activation reception assignment information of the first D2D link in a third subframe after a predetermined number (n) of subframes from the second subframe.

The data transmission/reception method may further include transmitting information indicating whether the data of the first D2D link has been successful received to the second device in a fourth subframe after a predetermined number (o) of subframes from the third subframe. At this time, it may be determined whether data received from the second device after a predetermined number (p) of subframes from the fourth subframe is initial transmission data or retransmission data based on the information indicating whether the data of the first D2D link has been successfully received.

The data transmission/reception method may further include: receiving release reception assignment information of the first D2D link from the base station and transmitting whether the release reception assignment information has been successfully received to the base station in a subframe after a predetermined number of subframes from a subframe in which the release reception assignment information of the first D2D link has been received.

The data transmission/reception method may further include: receiving activation transmission assignment information of a second D2D link from the base station in a fifth subframe and transmitting whether the activation transmission assignment information of the second D2D link has been successfully received to the base station in a sixth subframe after a predetermined number (m2) of subframes from the fifth subframe, wherein, when the sixth subframe collides with the second subframe, the transmission of whether the activation transmission assignment information of the second D2D link has been successfully received rather than reception of data of the first D2D link is preferentially performed.

The data transmission/reception method may further include transmitting data of the second D2D link to the second device based on the activation transmission assignment information of the second D2D link in a seventh subframe after a predetermined number (n2) of subframes from the sixth subframe.

At this time, in the sixth subframe, the data of the second D2D link may be transmitted to the second device, and buffer state information of the second D2D link may be transmitted to the base station.

At this time, the data of the second D2D link and reception success or failure information for the data of the first D2D link received from the second device may be transmitted to the second device in the sixth subframe.

In the data transmission/reception method, when the transmission of the data of the second D2D link is first transmission based on the activation transmission assignment information of the second D2D link, the transmission of the data of the second D2D link may be constantly performed as initial transmission or retransmission. Alternatively, when the transmission of the data of the second D2D link is first transmission based on the activation transmission assignment information of the second D2D link, the transmission of the data of the second D2D link may be performed as initial transmission or retransmission based on reception success or failure information received from the second device for previously transmitted data of the second D2D link.

The data transmission/reception method may further include: receiving activation transmission assignment information of a second D2D link from the base station in a fifth subframe and transmitting whether the activation transmission assignment information of the second D2D link has been successfully received to the base station in a sixth subframe after a predetermined number (m2) of subframes from the fifth subframe, wherein, when the sixth subframe collides with the fourth subframe, the transmission of whether the activation transmission assignment information of the second D2D link has been successfully received rather than the transmission of reception success or failure information for the data of the first D2D link is preferentially performed. At this time, the data transmission/reception method may further include transmitting the data of the second D2D link to the second device based on the activation transmission assignment information of the second D2D link in a seventh subframe after a predetermined number (n2) of subframes from the sixth subframe.

In still other example embodiments, a data transmission/reception method of a first device that performs data transmission to a second device through a first D2D link and data reception from the second device through a second D2D link includes: receiving release transmission assignment information of the first D2D link or release reception assignment information of the second D2D link from a base station in a first subframe; transmitting whether the release transmission assignment information or the release reception assignment information has been successfully received to the base station in a second subframe after a predetermined number (x) of subframes from the first subframe; and preferentially performing the transmission of whether the release transmission assignment information or the release reception assignment information has been successfully received when the second subframe collides with a subframe in which reception of the reception success or failure information from the second device for the data transmitted to the second device or transmission of the reception success or failure information for the data received from the second device is performed.

In the data transmission/reception method, first data of the second D2D link through the second D2D link after the release transmission assignment information of the first D2D link has been received may be constantly received according to initial transmission or retransmission. Alternatively, the first data of the second D2D link through the second D2D link after the release transmission assignment information of the first D2D link has been received may be received according to initial transmission or retransmission based on whether previously received data of the second D2D link has been successfully received.

In the data transmission/reception method, first data of the first D2D link through the first D2D link after the release reception assignment information of the second D2D link has been received may be constantly transmitted according to initial transmission or retransmission. Alternatively, the first data of the first D2D link through the first D2D link after the release reception assignment information of the second D2D link has been received may be transmitted according to initial transmission or retransmission based on reception success or failure information for previously received data of the first D2D link.

In still other example embodiments, a data reception method of a first device for D2D communication includes: receiving subframe cycle information for initial transmission from a base station; receiving activation reception assignment information for the D2D communication from the base station in a first subframe; transmitting whether the activation reception assignment information has been successfully received to the base station in a second frame after a predetermined number (m) of subframes from the first subframe; and receiving initial transmission data from the second device based on the activation reception assignment information and subframe cycle information for the initial transmission.

The data transmission/reception method may further include transmitting whether the initial transmission data received from the second device has been successfully received to the second device through a D2D link.

In the data transmission/reception method, when a subframe in which whether the initial transmission data has been successfully received is transmitted to the second device is a subframe for the initial transmission based on subframe cycle information for the initial transmission, whether the initial transmission data has been successfully received may be prevented from being transmitted to the second device.

BRIEF DESCRIPTION OF DRAWINGS

Example embodiments of the present invention will become more apparent by describing in detail example embodiments of the present invention with reference to the accompanying drawings, in which:

FIG. 10 is a conceptual diagram illustrating a CSI report method for the D2D communication in accordance with an example embodiment of the present invention;

FIG. 11 is a conceptual diagram illustrating a periodic CSI report method in the CSI report method for the D2D communication in accordance with an example embodiment of the present invention;

DESCRIPTION OF EXAMPLE EMBODIMENTS

Figure 1:
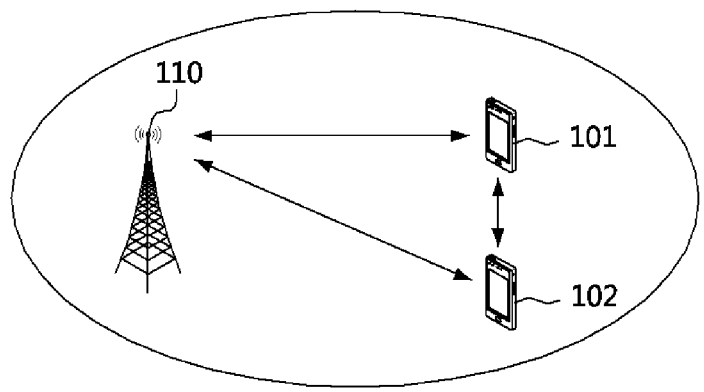
FIG. 1 is a conceptual diagram illustrating an environment in which two devices belonging to the same base station perform D2D communication.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, components, and/or groups thereof, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "device" used herein may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), mobile node, mobile, or other terms. Various embodiments of a device may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or devices having a combination of such functions, but are not limited thereto.

The term "base station" used herein generally denotes a fixed or mobile point that communicates with a device, and may be referred to as a Node-B, evolved Node-B (eNB), base transceiver system (BTS), access point, relay, femto-cell, and other terms.

Hereinafter, preferred embodiments of the present invention will be described in more detail with reference to the accompanying drawings. To facilitate the entire understanding of the invention, the same reference numerals in the drawings denote the same elements, and repetitive description of the same elements is omitted.

Operation Environment of D2D Communication in Accordance with Example Embodiment of Present Invention In the present invention, the term 'base station' is used as a meaning of a 'control device that controls one cell.' In an actual communication system, a 'physical base station' may control a plurality of cells. In this case, the 'physical base station' may be considered as including a 'plurality of base stations.' That is, when each cell is assigned a different parameter, this may mean that each 'base station' is assigned a different value.

In addition, in the example embodiments of the present invention, the device may be user equipment (UE), a mobile station (MS), a relay node (RN), a machine type communication (MTC) device, or the like.

In the D2D communication, two devices may belong to the same base station or different base stations (normally, base stations adjacent to each other).

FIG. 1 is a conceptual diagram illustrating an environment in which two devices belonging to the same base station perform D2D communication.

Referring to FIG. 1, a first device 101 and a second device 102 belonging to a first base station 110 transmit and receive various information necessary to perform D2D communication with the first base station 110.

Figure 2:
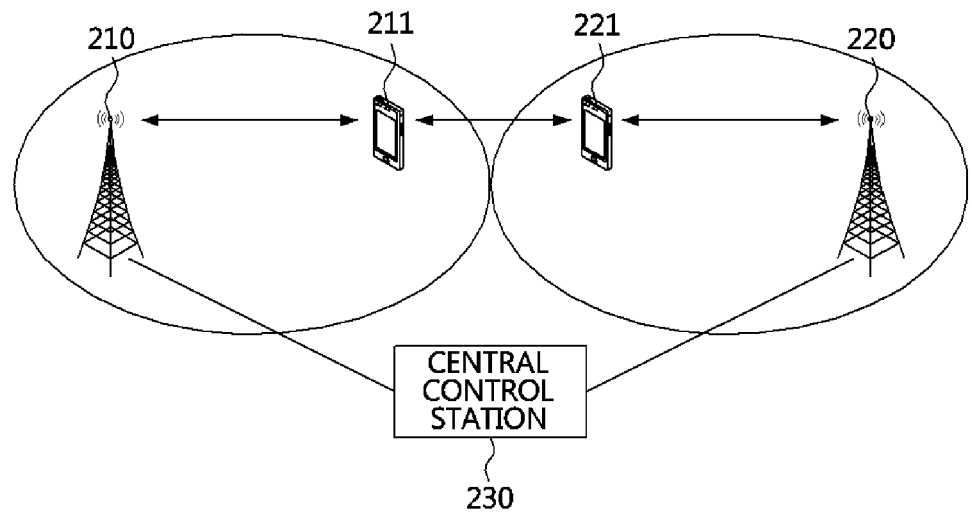
FIG. 2 is a conceptual diagram illustrating an environment in which two devices belonging to different base stations perform D2D communication.

On the other hand, FIG. 2 is a conceptual diagram illustrating an environment in which two devices belonging to different base stations perform D2D communication.

Referring to FIG. 2, a first device 211 belongs to a first base station 210 and a second device 221 belongs to a second base station 220. The first device 211 exchanges various information necessary to perform D2D communication with the first base station 210, and the second device 221 exchanges various information necessary to perform D2D communication with the second base station 220.

In addition, the first base station 210 and the second base station 220 are connected to a central control station 230. Here, the central control station collects information transmitted by each device to each base station and performs a D2D communication instruction and coordination function.

Although the central control station 230 is illustrated as a component separate from the first and second base stations 210 and 220 in FIG. 2, the central control station may be located inside a specific base station including the first and second base stations (that is, at least one of the first and second base stations may function as the central control station), located inside a 'physical base station,' or located separately therefrom.

When both the case in which two devices belong to the same base station in the D2D communication and the case in which the two devices belong to different base stations (environments illustrated in FIGS. 1 and 2) are compared, the two cases are the same in that a first device exchanges information with a first base station and first and second devices exchange information with each other.

When the environments of FIGS. 1 and 2 are compared, there is a difference in that a base station with which the second device 221 exchanges information is a first or second base station, but information to be exchanged by the second device with the first and/or second base stations may be the same.

Consequently, information exchanged between the devices and information exchanged between the device and the base station may be regarded as being the same in both the case in which the two devices belong to the same base station and the case in which the two devices belong to different base stations. Although the two devices are assumed to belong to the different base stations in the D2D communication as will be described later, the case in which the two devices belong to the same base station is also identically true unless otherwise defined. For example, it should be noted that the first and second base stations are not necessarily different base stations in the following description, and the first and second stations may be the same base station.

The D2D communication may be classified, according to a duplex scheme, into a link (hereinafter referred to as a first D2D link) from the first device to the second device and a link (hereinafter referred to as a second D2D link) from the second device to the first device in the D2D communication.

D2D communication in which the link from the first device to the second device and the link from the second device to the first device use the same frequency band in time division is referred to as 'time division D2D communication.'

In addition, D2D communication in which the link from the first device to the second device and the link from the second device to the first device use different frequency bands in frequency division is referred to as 'frequency division D2D communication.'

When communication between the device and the base station is based on time division duplexing (TDD), the time division D2D communication may use an uplink (UL) subframe, a downlink (DL) subframe, or both thereof in the frequency band to be used in the communication between the device and the base station.

When communication between the device and the base station is based on frequency division duplexing (FDD), the time division D2D communication may use a UL frequency band, a DL frequency band, or both thereof among frequency bands to be used in the communication between the device and the base station. In addition, the time division D2D communication may use a frequency band different from that used in communication between the device and the base station.

When communication between the device and the base station is based on a frequency division scheme, the frequency division D2D communication may use both the UL and DL frequency bands used in the communication between the device and the base station and use a frequency band different from that used between the device and the base station.

Method of SRS Transmission/Reception Control for Adaptive Transmission and CSI Transmission/Reception For adaptive transmission of D2D communication, one device may transmit an SRS for measuring a channel state of a D2D link to another device.

The SRS may be configured to be transmitted and received periodically or aperiodically. A device receiving the SRS measures a channel state of a D2D link and reports the measured channel state to the base station. The base station schedules the D2D link based on CSI transmitted by the device.

As described above, there are a link (first D2D link) from the first device to the second device and a link (second D2D link) from the second device to the first device in the D2D communication.

Hereinafter, a first example applicable to the time division D2D communication and the frequency division D2D communication and a second example applicable to the frequency division D2D communication will be described.

1) First Example

An example of SRS transmission/reception control and CSI transmission/reception for one of the link (first D2D link) from the first device to the second device and the link (second D2D link) from the second device to the first device described above will be described with reference to FIG. 3.

Figure 3:
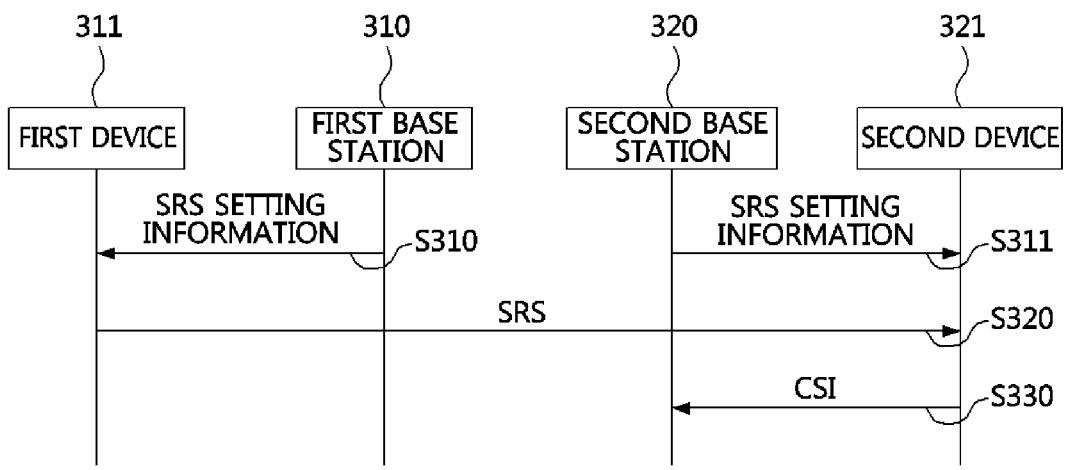
FIG. 3 is a conceptual diagram illustrating a procedure for a first D2D link in an example of a method of SRS transmission/reception control and CSI transmission/reception of the D2D communication in accordance with the present invention.

FIG. 3 is a conceptual diagram illustrating a procedure for the first D2D link in an example of a method of SRS transmission/reception control and CSI transmission/reception of the D2D communication in accordance with the present invention.

In FIG. 3, a method of SRS transmission/reception control and CSI transmission/reception for the link from the first device to the second device between two links (first and second links) of D2D communication is assumed. The example of FIG. 3 may be applied to both the time division D2D communication and the frequency division D2D communication.

Referring to FIG. 3, a first base station 310 may transmit setting information for transmitting an SRS to the first device 311 through higher-order layer signaling (S310), and a second base station 320 may transmit setting information for receiving the SRS to a second device 321 through higher-order layer signaling (S311).

For example, the SRS and the higher-order layer signaling may be an SRS and radio resource control (RRC) signaling defined for the UL in 3GPP, respectively.

SRS setting information may be divided into device (UE)-specific SRS setting information and cell-specific SRS setting information.

The device-specific SRS setting information may include SRS frequency bandwidth information, SRS hopping frequency bandwidth information, SRS frequency domain position information, information indicating an SRS transmission cycle and a subframe offset, SRS cyclic shift information, SRS transmission comb information, SRS duration information, SRS antenna information, and the like. For example, in 3GPP, the SRS frequency bandwidth information, the SRS hopping frequency bandwidth information, the SRS frequency domain position information, and the information indicating the SRS transmission cycle and the subframe offset may be denoted by srs-Bandwidth, srs-HoppingBandwidth, freqDomainPosition, and srs-ConfigIndex, respectively.

In addition, in 3GPP, the SRS cyclic shift information, the SRS transmission comb information, the SRS duration information, and the SRS antenna information may be denoted by cyclicShift, transmissionComb, duration, and srs-AntennaPort, respectively.

The same device-specific SRS setting information may be transmitted from the first base station 310 to the first device 311 and from the second base station 320 to the second device 321 (S310 and S311). That is, the device-specific SRS setting information including the same contents may be setting information for transmitting the SRS for the first device and may be setting information for receiving the SRS for the second device.

When part or all of the device-specific SRS setting information for communication between the device and the base station is reused as the device-specific SRS setting information for D2D communication, the device-specific SRS setting information to be reused may not be included in the device-specific SRS setting information for the D2D communication.

The cell-specific SRS setting information may include SRS frequency bandwidth setting information indicating a frequency bandwidth in which an SRS may be transmitted, SRS subframe setting information indicating a subframe in which the SRS may be transmitted, maximum frequency bandwidth information of the SRS, and the like.

For example, in 3GPP, the SRS frequency bandwidth setting information, the SRS subframe setting information, and the maximum frequency bandwidth information of the SRS may be denoted by srs-BandwidthConfig, srs-SubframeConfig, and srs-MaxUpPts, respectively.

The cell-specific SRS setting information to be transmitted by each base station to each device may be subdivided as follows.

First, when cell-specific SRS setting information for communication between the device and the base station of a cell to which the first device 311, which transmits an SRS, belongs is used as cell-specific SRS setting information for D2D communication, the first base station 310 may not separately transmit the cell-specific SRS setting information for the D2D communication to the first device 311 (that is, previously set cell-specific SRS settings are used). In addition, the second base station 320 may transmit the cell-specific SRS setting information for the communication between the device and the base station of the cell to which the first device 311 belongs as the cell-specific SRS setting information for the D2D communication to the second device 321 that receives the SRS.

Next, when cell-specific SRS setting information for communication between the device and the base station of a cell to which the second device 321, which receives the SRS, belongs is used as cell-specific SRS setting information for D2D communication, the first base station 310 may transmit the cell-specific SRS setting information for the communication between the device and the base station of the cell to which the second device 321 belongs as the cell-specific SRS setting information for the D2D communication to the first device 311 that transmits the SRS. In addition, the second base station may not separately transmit the cell-specific SRS setting information for the D2D communication to the second device 321 (that is, previously set cell-specific SRS settings are used).

Finally, when the cell-specific SRS setting information for the D2D communication is different from the cell-specific SRS setting information for the communication between the device and the base station, the first base station 310 and the second base station 320 may transmit the same cell-specific SRS setting information to the first device 311 and the second device 321, respectively. When part or all of the cell-specific SRS setting information for the communication between the device and the base station is reused as the cell-specific SRS setting information for the D2D communication, the cell-specific SRS setting information to be reused may not be included in the cell-specific SRS setting information for the D2D communication.

The first device 311 transmits an SRS to the second device 321 based on the received SRS setting information (S320). The second device 321 receiving the SRS may transmit CSI for the link (first D2D link) from the first device to the second device generated using the received SRS to the second base station 320 through a physical UL shared channel (PUSCH) or a physical UL control channel (PUCCH) (S330).

The CSI may include a combination of rank information, precoding matrix information, precoding type information, channel quality information, and the like. For example, in 3GPP, the CSI, the rank information, the precoding matrix information, the precoding type information, and the channel quality information may be a channel state indicator, a rank indicator (RI), a precoding matrix indicator (PMI), a precoding type indicator (PTI), and a channel quality indicator (CQI), respectively.

On the other hand, although the method of SRS transmission/reception control and CSI transmission/reception for one link (first D2D link) of the two D2D communication links has been described above with reference to FIG. 3, an example of a method of SRS transmission/reception control and CSI transmission/reception for the other link (second D2D link) of the two D2D communication links will be described with reference to FIG. 4.

Figure 4:
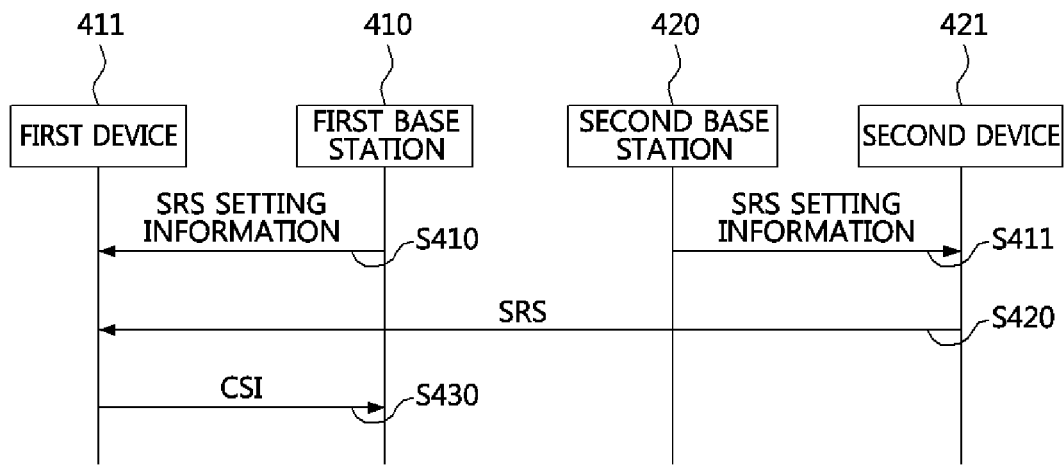
FIG. 4 is a conceptual diagram illustrating a procedure for a second D2D link in an example of a method of SRS transmission/reception control and CSI transmission/reception of the D2D communication in accordance with the present invention.

FIG. 4 is a conceptual diagram illustrating a procedure for the second D2D link in the example of the method of SRS transmission/reception control and CSI transmission/reception of the D2D communication in accordance with the present invention.

In FIG. 4, the link from the second device to the first device between the two D2D communication links is assumed. The SRS setting information transmission/reception and the SRS transmission/reception may be equally applied to both the time division D2D communication and the frequency division D2D communication. The transmission/reception of the SRS for the link (second D2D link) from the second device to the first device follows the same process as the transmission/reception of the SRS for the link (first D2D link) from the first device to the second device described with reference to FIG. 3.

That is, a second base station 420 may transmit setting information for transmitting the SRS to a second device 421 through higher-order layer signaling (S411), and a first base station 410 may transmit setting information for receiving the SRS to a first device 411 through higher-order layer signaling (S410).

For example, the SRS in the time division D2D communication may be an SRS defined for the UL in 3GPP, and the SRS in the frequency division D2D communication may be an SRS defined for the DL in 3GPP. Here, the SRS defined for the DL is an SRS to be transmitted by a device to a base station or another device in a DL frequency band.

The SRS setting information may be divided into device-specific SRS setting information and cell-specific SRS setting information.

The device-specific SRS setting information may include SRS frequency bandwidth information, SRS hopping frequency bandwidth information, the SRS frequency domain position information, information indicating an SRS transmission cycle and a subframe offset, SRS cyclic shift information, SRS transmission comb information, SRS duration information, SRS antenna information, and the like. The first base station and the second base station may transmit the same device-specific SRS setting information to the first device and the second device, respectively. When part or all of the device-specific SRS setting information for the communication between the device and the base station is reused as the device-specific SRS setting information for the D2D communication, the device-specific SRS setting information to be reused may not be included in the device-specific SRS setting information for the D2D communication.

The cell-specific SRS setting information may include SRS frequency bandwidth setting information indicating a frequency bandwidth in which an SRS may be transmitted, SRS subframe setting information indicating a subframe in which the SRS may be transmitted, maximum frequency bandwidth information of the SRS, and the like. The cell-specific SRS setting information to be transmitted by each base station to each device may be subdivided as follows.

First, when cell-specific SRS setting information for communication between the device and the base station of a cell to which the second device 421, which transmits an SRS, belongs is used as cell-specific SRS setting information for the D2D communication, the second base station 420 may not separately transmit the cell-specific SRS setting information for the D2D communication to the second device 421. In addition, the first base station 410 may transmit the cell-specific SRS setting information for the communication between the device and the base station of the cell to which the second device 421 belongs as the cell-specific SRS setting information for the D2D communication to the first device 411 that receives the SRS.

Next, when cell-specific SRS setting information for communication between the device and the base station of a cell to which the first device 411, which receives the SRS, belongs is used as cell-specific SRS setting information for the D2D communication, the second base station 420 may transmit the cell-specific SRS setting information for the communication between the device and the base station of the cell to which the first device 411 belongs as the cell-specific SRS setting information for the D2D communication to the second device 421 that transmits the SRS. In addition, the first base station 410 may not separately transmit the cell-specific SRS setting information for the D2D communication to the first device 411 (that is, previously set cell-specific SRS settings are used).

Finally, when the cell-specific SRS setting information for the D2D communication is different from the cell-specific SRS setting information for the communication between the device and the base station, the first base station 410 and the second base station 420 may transmit the same cell-specific SRS setting information to the first device 411 and the second device 421, respectively. When part or all of the cell-specific SRS setting information for the communication between the device and the base station is reused as the cell-specific SRS setting information for the D2D communication, the cell-specific SRS setting information to be reused may not be included in the cell-specific SRS setting information for the D2D communication.

The second device 421 transmits the SRS to the first device 411 based on the received SRS transmission setting information (S420). The first device 411 receiving the SRS may transmit CSI for the link (second D2D link) from the second device to the first device to the first base station 410 through the PUSCH or PUCCH.

On the other hand, the CSI transmission/reception may differ according to whether the D2D communication is time or frequency division D2D communication.

First, in the frequency division D2D communication, the link (second D2D link) from the second device to the first device uses a different frequency band from the link (first D2D link) from the first device to the second device. Accordingly, the transmission/reception of the CSI for the link from the second device to the first device is performed independent of the transmission/reception of the CSI for the link from the first device to the second device. The transmission/reception of the CSI for the link from the second device to the first device follows the same process as the transmission/reception of the CSI for the link from the first device to the second device. That is, the CSI may include a combination of rank information, precoding matrix information, precoding type information, channel quality information, and the like.

Next, because the link from the second device to the first device uses the same frequency band as the link from the first device to the second device in the case of the time division D2D communication, a CSI report of the first device to the first base station for the link from the second device to the first device may be simply configured using channel reciprocity.

When there are SRS transmission/reception and CSI transmission/reception for the link from the first device to the second device described with reference to FIG. 3, the rank information, the precoding matrix information, and the precoding type information for the link from the second device to the first device may be recognized through the CSI for the link from the first device to the second device transmitted by the second device to the second base station. Accordingly, the CSI to be transmitted by the first device to the first base station may not include the rank information, the precoding matrix information, and the precoding type information. On the other hand, unlike the rank information, the precoding matrix information, and the precoding type information, the channel quality information for the link from the second device to the first device may not be accurately recognized through the channel quality information for the link from the first device to the second device because an interference environment of the second device is different from an interference environment of the first device. Accordingly, the first device receives the SRS transmitted by the second device and derives the channel quality information for the link from the second device to the first device. In addition, the CSI transmitted by the first device to the first base station may include the channel quality information for the link from the second device to the first device.

2) Second Example

The SRS transmission/reception and the CSI transmission/reception for two links of the D2D communication have been described above with reference to FIGS. 3 and 4.

On the other hand, assuming that the SRS transmission/reception and the CSI transmission/reception for the link from the first device to the second device between the two links of the D2D communication are performed and the D2D communication is time division D2D communication, an application of another example is possible for the method of SRS transmission/reception and CSI transmission/reception.

Figure 5:
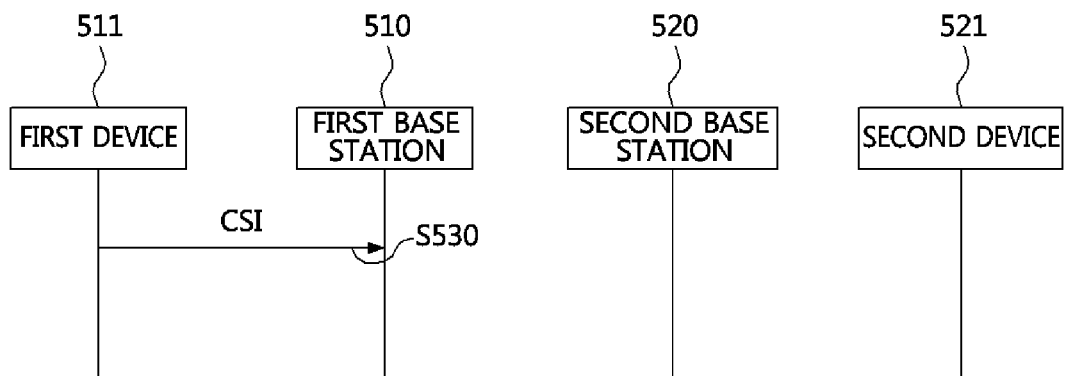
FIG. 5 is a conceptual diagram illustrating another example of the method of SRS transmission/reception control and CSI transmission/reception of the D2D communication in accordance with the present invention.

FIG. 5 is a conceptual diagram illustrating another example of the method of SRS transmission/reception control and CSI transmission/reception of the D2D communication in accordance with the present invention.

In FIG. 5, a link from a second device 521 to a first device 511 between two links of the D2D communication may be assumed and applied to the time division D2D communication as described above.

In the second example, as illustrated in FIG. 5, the SRS transmission/reception for the link from the second device 521 to the first device 511 may not be performed. Accordingly, the base station may not transmit SRS setting information to the device.

In the time division D2D communication, channel reciprocity may be used because the link (second D2D link) from the second device to the first device uses the same frequency band as the link (first D2D link) from the first device to the second device.

When there are SRS transmission/reception and CSI transmission/reception for the link (first D2D link) from the first device to the second device as described with reference to FIG. 3, rank information, precoding matrix information, and precoding type information for the link (second D2D link) from the second device to the first device may be recognized through CSI for the link (first D2D link) from the first device to the second device transmitted by the first device to the first base station.

Accordingly, the CSI to be transmitted by the second device to the second base station may not include the rank information, the precoding matrix information, and the precoding type information. On the other hand, the channel quality information for the link from the second device to the first device may not be accurately recognized through the channel quality information for the link from the first device to the second device because an interference environment of the second device is different from an interference environment of the first device. Accordingly, the first device derives interference information by measuring received interference. In addition, the CSI to be transmitted by the first device to the first base station may include interference information for the link from the second device to the first device.

3) Third Example

On the other hand, path losses of the first and second devices should be recognized for power control of D2D communication.

The path loss may be estimated using the SRS transmitted by the first device to the second device or transmitted by the second device to the first device. For this, SRS transmission power information may be included in SRS setting information transmitted by the base station to the device.

The device, which transmits the SRS, transmits the SRS according to the transmission power information included in the SRS setting information, and the device receiving the SRS may be configured to estimate the path loss by comparing transmission power information included in the SRS setting information to actual reception power of the SRS. The device receiving the SRS may be configured to transmit estimated path loss information to the base station to which the device, which receives the SRS, belongs.

In addition, because the device, which receives the SRS, transmits the CSI to the base station as described above, the base station may generate transmission power control information based on the received path loss information and the CSI and transmit the transmission power control information to the device.

The transmission power control information may be provided to a transmission device of D2D communication in the form of transmission assignment information and provided to a reception device of the D2D communication in the form of reception assignment information. Specific description of the transmission assignment information and the reception assignment information will be described later.

The device receiving the transmission assignment information transmits data by determining data transmission power according to transmission power control information. The device receiving the reception assignment information demodulates data by determining data transmission power according to transmission power control information.

Data Transmission/Reception Method of D2D Communication

Hereinafter, the data transmission/reception method of the D2D communication will be described. In the following description, it is assumed that communication between a device and a base station is based on frequency division and the D2D communication uses a UL frequency band used in the communication between the device and the base station. However, a basic concept of the present invention is also applicable to other schemes.

In some of the following example embodiments, the data transmission/reception method will be described based on the link (first D2D link) from the first device to the second device. That is, in the following description, the first device is a transmission device of the D2D communication and the second device is a reception device of the D2D communication. Unless otherwise defined, a data transmission/reception scheme for the link from the first device to the second device as will be described later may be equally applied to data transmission/reception for the link (second D2D link) from the second device to the first device.

Basically, the first D2D link and the second D2D link may independently operate. However, a connection operation between links when the link (second D2D link) from the second device to the first device is added in a state in which the link (first D2D link) from the first device to the second device is present or when one D2D link is released in a state in which the first D2D link and the second D2D link are present will be described in fifth and sixth example embodiments of the following example embodiments.

A plurality of hybrid automatic repeat request (HARQ) processes may be present for the link from the first device to the second device. Operation procedures of the HARQ processes are the same and operate independent of each other. Unless otherwise defined, one HARQ process will be described here.

Scheduling may be divided into scheduling for initial transmission and scheduling for retransmission. Here, the retransmission is an operation of retransmitting data transmitted through the initial transmission, and a transmission format of the retransmission may be the same as or different from a transmission format of the initial transmission.

On the other hand, an operation in which a reception side receives data through initial transmission may be an operation in which a soft buffer is initialized for combining and data is demodulated only with a received signal, and an operation in which the reception side receives data through the retransmission may be an operation in which a previously received signal stored in the soft buffer and a newly received signal are combined and demodulated.

Here, the transmission format may include a combination of resource assignment information, modulation and coding information, redundant version information, precoding information, and the like. When data includes a plurality of transport blocks, the above-described process may be applied to each transport block.

1) First Example Embodiment

First, the first example embodiment of the data transmission/reception method in accordance with the present invention will be described.

Figure 6:
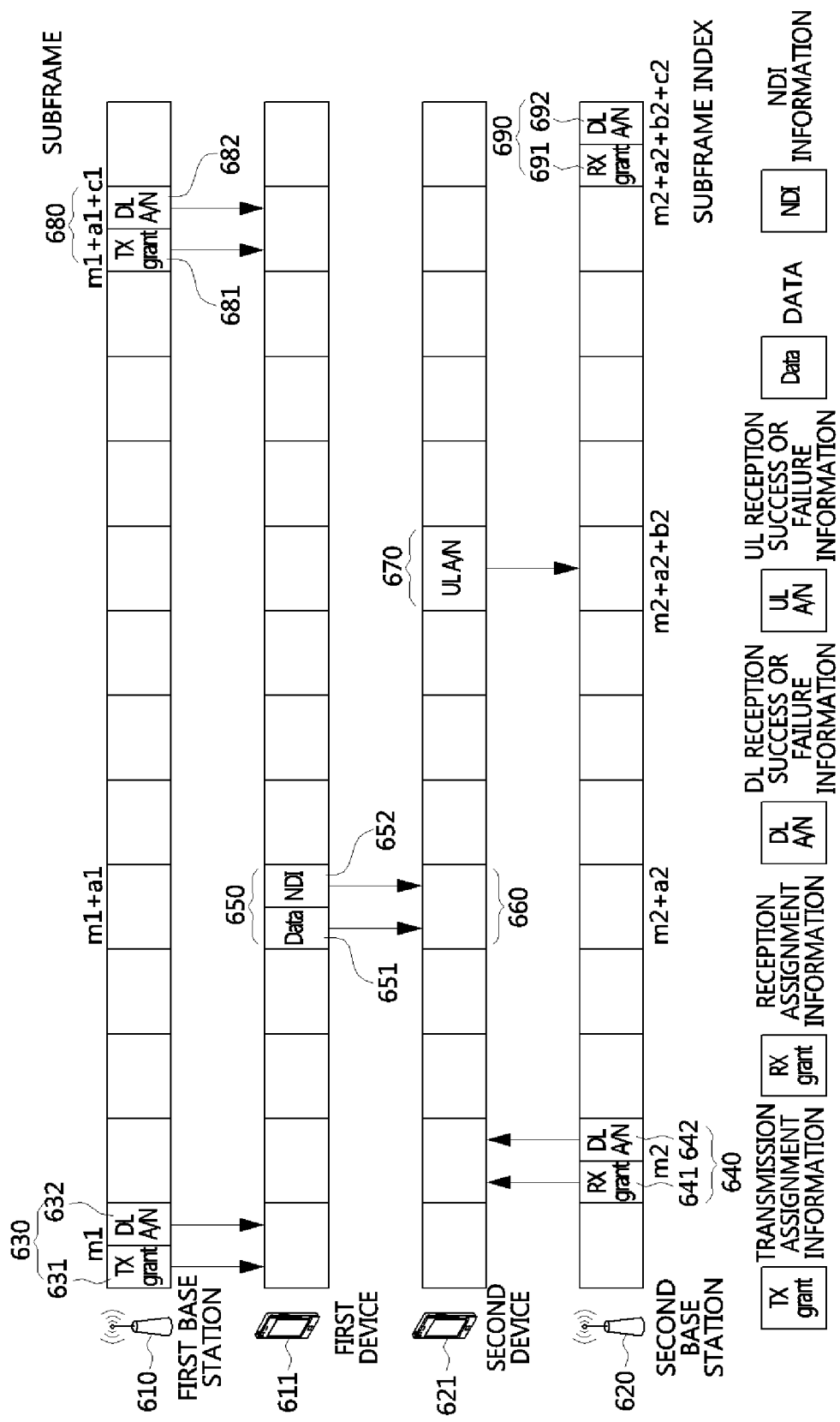
FIG. 6 is a subframe timing diagram illustrating a first example embodiment of a data transmission/reception method of the D2D communication in accordance with the present invention.

FIG. 6 is a subframe timing diagram illustrating the first example embodiment of the data transmission/reception method of the D2D communication in accordance with the present invention.

Referring to FIG. 6, a first base station 610 may transmit transmission assignment information 631 and DL reception success or failure information 632 to a first device 611 in a subframe m1 (630).

The transmission assignment information 631 may include a combination of resource assignment information, modulation and coding information, transmission precoding matrix information, cyclic shift information, power control information, HARQ process number information, new data indicator (NDI) information, redundant version information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like. However, the transmission assignment information may be configured to selectively include the remaining information excluding core information such as the resource assignment information and the modulation and coding information according to a system configuration and a transmission format.

The DL reception success or failure information 632 indicates two states of a positive acknowledgement (ACK) and a negative acknowledgement (NACK). The DL reception success or failure information is transmitted using a DL channel from the base station to the device as information indicating whether data previously transmitted by the first device to the second device through a D2D link has been successfully received by the second device.

In the case of retransmission, the first base station 610 may not transmit the transmission assignment information to the first device 611. In the case of first transmission, the first base station 610 may not transmit DL reception success or failure information to the first device 611. When data includes a plurality of transport blocks, the DL reception success or failure information indicates two states of the ACK and NACK for each transport block.

A second base station 620 may transmit reception assignment information 641 and DL reception success or failure information 642 to a second device 621 in a subframe m2 (640).

The reception assignment information 641 may be configured to include a combination of resource assignment information, modulation and coding information, transmission precoding matrix information, cyclic shift information, power control information, HARQ process number information, NDI information, redundant version information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like. Like the above-described transmission assignment information, the reception assignment information may be configured to selectively include the remaining information excluding core information such as the resource assignment information and the modulation and coding information according to a system configuration and a transmission format.

In the case of retransmission, the second base station 620 may not transmit the reception assignment information 641 to the second device 621. In the case of first transmission, the second base station 620 may not transmit DL reception success or failure information 642 to the second device 621.

When data includes a plurality of transport blocks, the DL reception success or failure information indicates two states of the ACK and NACK for each transport block.

When the first base station transmits the transmission assignment information to the first device, the second base station constantly transmits the reception assignment information to the second device. When the first base station does not transmit the transmission assignment information to the first device, the second base station does not transmit the reception assignment information to the second device.

Although an example in which a subframe m1 (630) in which the first base station transmits the transmission assignment information to the first device is different from a subframe m2 (640) in which the second base station transmits the reception assignment information to the second device is illustrated in FIG. 6, it should be noted that a subframe in which the first base station transmits the transmission assignment information to the first device may be the same as or different from a subframe in which the second base station transmits the reception assignment information to the second device.

When the first base station 610 transmits the DL reception success or failure information 632 to the first device 611, the second base station 620 constantly transmits DL reception success or failure information 642 to the second device 621.

At this time, a state of the DL reception success or failure information 632 transmitted by the first base station to the first device is the same as a state of the DL reception success or failure information 642 transmitted by the second base station to the second device. When the first base station does not transmit the DL reception success or failure information to the first device, the second base station does not transmit the DL reception success or failure information to the second device.

Although an example in which the subframe m1 (630) in which the first base station transmits the DL reception success or failure information to the first device is different from the subframe m2 (640) in which the second base station transmits the DL reception success or failure information to the second device is illustrated in FIG. 6, it should be noted that a subframe in which the first base station transmits the DL reception success or failure information to the first device may be the same as or different from a subframe in which the second base station transmits the DL reception success or failure information to the second device.

On the other hand, although an example in which the above-described transmission assignment information and reception assignment information is transmitted in the same subframe is illustrated in FIG. 6, the transmission assignment information and the reception assignment information may be configured to be transmitted in a subframe different from that of the DL reception success or failure information.

The first device 611 transmits data 651 to the second device in a subframe m1+a1 (650). At this time, data to be transmitted may differ according to a state of the DL reception success or failure information 632 received in the subframe m1, reception of the transmission assignment information 631, and whether demodulation has succeeded.

First, the case in which the first device has received the transmission assignment information 631 will be assumed and described. When NDI information of transmission assignment information received by the first device in the subframe m1 indicates initial transmission (for example, when the NDI information of the received transmission assignment information is different from NDI information of the latest received transmission assignment information among transmission assignment information received before the subframe m1 when an NDI is used in a toggle scheme as will be described later), the first device transmits data in initial transmission according to the transmission assignment information received in the subframe m1.

Next, when the NDI information of the transmission assignment information by the first device in the subframe m1 indicates retransmission (for example, when the NDI information of the received transmission assignment information is the same as the NDI information of the latest received transmission assignment information among the transmission assignment information received before the subframe m1 when the NDI is used in the toggle scheme), the first device transmits data as adaptive retransmission according to the transmission assignment information received in the subframe m1.

Next, the case in which the first device does not receive the transmission assignment information will be assumed and described. When the DL reception success or failure information is the NACK, the first device transmits data 651 as non-adaptive retransmission. For example, the non-adaptive retransmission may be an operation of generating and transmitting data by changing only part of redundant version information or the like in the latest received transmission assignment information among the transmission assignment information received before the subframe m1 and equally applying all the remaining information. Here, the redundant version information may be preset to a specific value according to how many times the retransmission has been performed. When the DL reception success or failure information is the ACK, the first device does not transmit data. The first device transmits data a1 subframes after the reception of the transmission assignment information and the DL reception success or failure information in the subframe m1. Here, a value of a1 may be preset to a specific value, and the first base station notifies the first device of the specific value through higher-order layer signaling.

The second device receives data 651 transmitted by the first device in a subframe m2+a2 (660). At this time, a data demodulation scheme may differ according to the state of the DL reception success or failure information received in a subframe m2, the reception of reception assignment information, and whether demodulation has succeeded.

First, a description will be given under assumption that the second device has received reception assignment information. When the NDI information among the reception assignment information received by the second device in the subframe m2 indicates initial transmission (for example, when the NDI information of the received reception assignment information is different from the NDI information of the latest received reception assignment information among the reception assignment information received before the subframe m2 when the NDI is used in the toggle scheme), the second device demodulates data according to the reception assignment information received in the subframe m2 in initial transmission. Next, when the NDI information among the reception assignment information received by the second device in the subframe m2 indicates retransmission (for example, when the NDI information of the received reception assignment information is the same as the NDI information of the latest received reception assignment information among the reception assignment information received before the subframe m2 when the NDI is used in the toggle scheme), the second device demodulates data as adaptive retransmission according to the reception assignment information received in the subframe m2.

Next, the case in which the second device has not received the reception assignment information will be assumed and described. When the DL reception success or failure information is the NACK, the second device demodulates data as non-adaptive retransmission. For example, the non-adaptive retransmission may be an operation of demodulating data by changing only part of redundant version information or the like in the latest received reception assignment information among the reception assignment information received before the subframe m2 and equally applying all the remaining information. Here, the redundant version information may be preset to a specific value according to how many times the retransmission has been performed. When the DL reception success or failure information is the ACK, the second device does not demodulate data. The second device demodulates data a2 subframes after the reception of the reception assignment information and the DL reception success or failure information in the subframe m2. Here, a value of a2 may be preset to a specific value, and the second base station may notify the second device of the specific value through higher-order layer signaling.

After the second device demodulates the data in a subframe m2+a2 (660), UL reception success or failure information is transmitted to the second base station in a subframe m2+a2+b2 (670) after b2 subframes. Here, a value of b2 may be preset to a specific value, and the second base station may notify the second device of the specific value through higher-order layer signaling.

The UL reception success or failure information may be configured to indicate three states of the ACK, the NACK, and discontinuous transmission (DTX).

The case in which the UL reception success or failure information is the ACK is when the second device has succeeded data demodulation.

An example in which the UL reception success or failure information is the NACK may be when a received power level of a demodulation reference signal exceeds a first threshold but data demodulation fails. Another example may be when a received power level of data exceeds a second threshold but data demodulation fails as the case in which the UL reception success or failure information is the NACK.

The case in which the UL reception success or failure information is the DTX is the case in which the UL reception success or failure information is neither the ACK nor the NACK.

When the UL reception success or failure information is the ACK or the NACK, the second device indicates the ACK or the NACK in the UL reception success or failure information and transmits the UL reception success or failure information indicating the ACK or the NACK to the second base station. When the UL reception success or failure information is the DTX, the second device does not transmit the UL reception success or failure information. When data includes a plurality of transport blocks, the UL reception success or failure information indicates two states of the ACK and NACK and an additional DTX state for each transport block.

Thereafter, the base station and the device may iterate the above process. The first base station may transmit transmission assignment information 681 and DL reception success or failure information 682 to the first device in a subframe $m1+a1+c1$ (680) after c1 subframes from a subframe $m1+a1$ in which the first device has transmitted data. Here, a value of c1 may be preset to a specific value, and the first base station may notify the first device of the specific value through higher-order layer signaling. The second base station may transmit reception assignment information 691 and DL reception success or failure information 692 to the second device in a subframe $m2+a2+b2+c2$ (690) after c2 subframes from a subframe $m2+a2+b2$ in which the second device has transmitted the UL reception success or failure information. Here, a value of c2 may be preset to a specific value, and the second base station may notify the second device of the specific value through higher-order layer signaling.

On the other hand, the first device may notify the second device of whether data corresponds to initial transmission or retransmission through NDI information 652. Every time the first device transmits data to the second device, the first device transmits the NDI information 652 to the second device along with the data 651. The data and the NDI information are transmitted in the same subframe 650. A method of providing notification of whether the data transmitted with the NDI information corresponds to the initial transmission or the retransmission will be described later.

In the first example embodiment, the first base station notifies the first device of the values of a1 and c1 through higher-order layer signaling. More specifically, the notification of each of the values of a1 and c1 may be directly provided through higher-order layer signaling, and each of the values of a1 and c1 may be derived from a higher-layer signaled value.

In the first example embodiment, the second base station notifies the second device of the values of a2, b2, and c2 through higher-order layer signaling More specifically, the notification of each of the values of a2, b2, and c2 may be directly provided through higher-order layer signaling, and each of the values of a2, b2, and c2 may be derived from a higher-layer signaled value.

2) Second Example Embodiment

Next, the second example embodiment of the data transmission/reception method in accordance with the present invention will be described.

Figure 7:
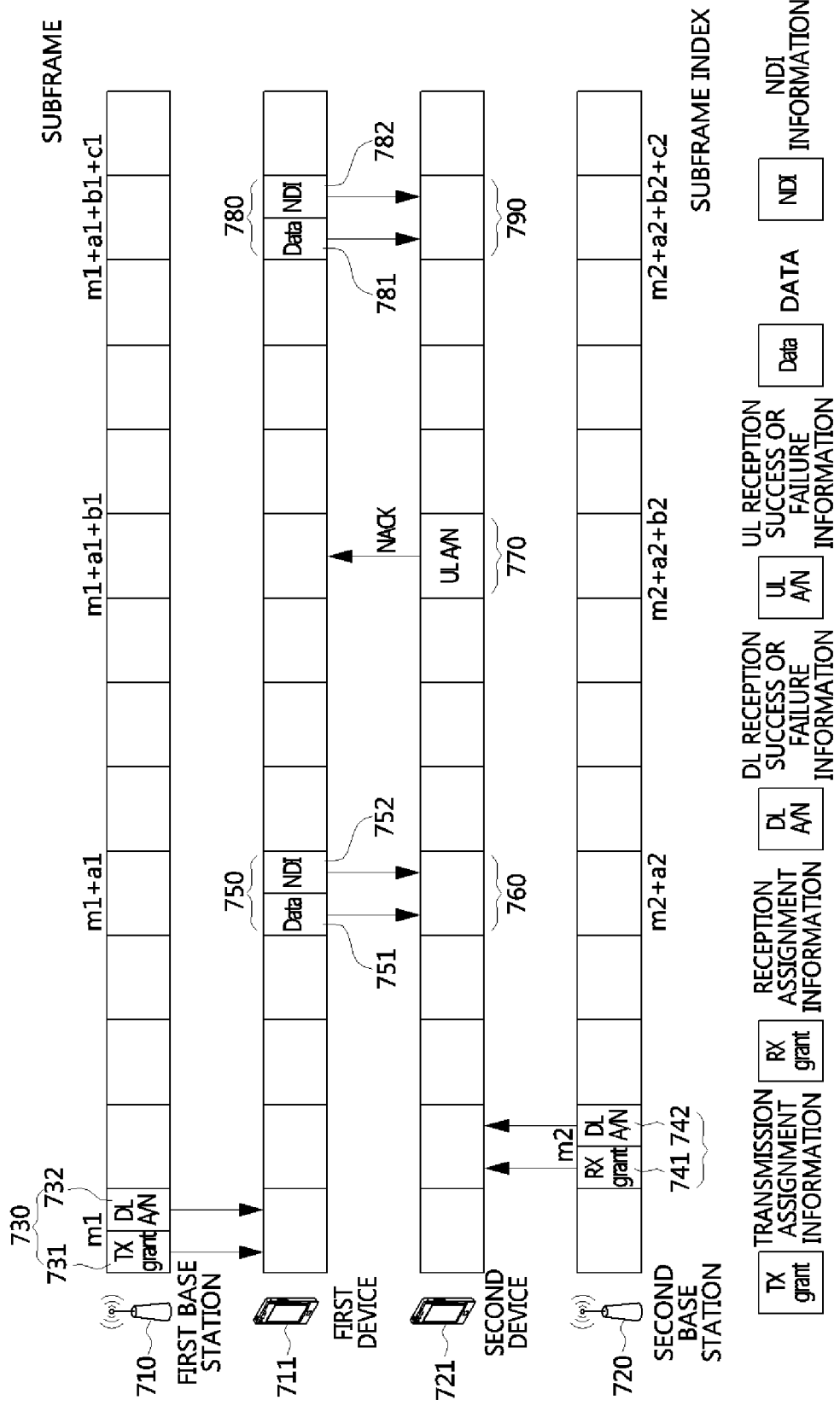
FIG. 7 is a subframe timing diagram illustrating a second example embodiment of the data transmission/reception method of the D2D communication in accordance with the present invention.

FIG. 7 is a subframe timing diagram illustrating the second example embodiment of the data transmission/reception method of the D2D communication in accordance with the present invention.

Referring to FIG. 7, an operation in which a first base station 710 transmits transmission assignment information 731 and DL reception success or failure information 732 to a first device 711 is the same as in the first example embodiment. In addition, an operation in which a second base station 720 transmits reception assignment information 741 and DL reception success or failure information 742 to a second device 721 is also the same as in the first example embodiment. In addition, an operation in which the first device 711 transmits data 751 to the second device 721 based on the transmission assignment information 731 and the DL reception success or failure information 732 received from the first base station 710 is also the same as in the first example embodiment. In addition, an operation in which the second device 721 demodulates the data 751 transmitted by the first device 711 based on the reception assignment information 741 and the DL reception success or failure information 742 received from the second base station 720 is also the same as in the first example embodiment. In addition, a scheme in which the second device 721 determines the state of the UL reception success or failure information is the same as in the first example embodiment.

When the state of the UL reception success or failure information transmitted by the second device is the ACK, the second device transmits the UL reception success or failure information to the second base station. When the state of the UL reception success or failure information is the DTX, the second device does not transmit the UL reception success or failure information. Thereafter, an operation in which the first base station transmits the transmission assignment information and the DL reception success or failure information to the first device and an operation in which the second base station transmits the reception assignment information and the DL reception success or failure information to the second device are the same as in the above-described first example embodiment.

On the other hand, when the state of the UL reception success or failure information transmitted by the second device is the NACK, the second device directly transmits the UL reception success or failure information to the first device (770), and the first device may be configured to directly receive the UL reception success or failure information transmitted by the second device without passing through the base station.

On the other hand, because a receiver, which receives the UL reception success or failure information, may differ according to the state of the UL reception success or failure information in the second example embodiment unlike the first example embodiment, transmission power at which the UL reception success or failure information is transmitted may differ according to the state of the UL reception success or failure information.

For example, when the state of the UL reception success or failure information is the ACK, transmission power at which the UL reception success or failure information is transmitted may be determined according to reception power required for a link between the second device and the second base station. When the state of the UL reception success or failure information is the NACK, transmission power at which the UL reception success or failure information is transmitted may be determined according to a larger value between reception power required for the link between the second device and the second base station and reception power required for a link between the second device and the first device.

Because the second device may directly transmit the UL reception success or failure information to the first device in the second example embodiment, the first device attempts to demodulate the UL reception success or failure information after b1 subframes from a subframe m1+a1 (750) in which the first device has transmitted data to the second device. Here, a value of b1 may be preset to a specific value, and the first base station may notify the first device of the specific value through higher-order layer signaling.

When the UL reception success or failure information demodulated by the first device is not the NACK, a subsequent operation of the first device is the same as in the first example embodiment. On the other hand, when the UL reception success or failure information demodulated by the first device is the NACK, the first device transmits data to the second device in a subframe m1+a1+b1+c1 (780) as non-adaptive retransmission. Here, the non-adaptive retransmission is the same as described in the first example embodiment. A value of c1 may be preset to a specific value, and the first base station may notify the first device of the specific value through higher-order layer signaling.

When the state of the UL reception success or failure information transmitted by the second device is not the NACK, a subsequent operation of the second device is the same as in a first scheduling scheme. On the other hand, when the state of the UL reception success or failure information transmitted by the second device in a subframe m2+a2+b2 (770) is the NACK, the second device demodulates data in a subframe m2+a2+b2+c2 (790) as non-adaptive retransmission. Here, the non-adaptive retransmission is the same as described in the first example embodiment. A value of c2 may be preset to a specific value, and the second base station may notify the second device of the specific value through higher-order layer signaling. Thereafter, the base station and the device may iterate the above process.

In the second example embodiment, the first base station may notify the first device of the values of b1 and c1 through higher-order layer signaling. More specifically, the notification of each of the values of b1 and c1 may be directly provided through higher-order layer signaling, and each of the values of b1 and c1 may be derived from a higher-layer signaled value. For example, the first base station may notify the first device of a data retransmission interval through higher-order layer signaling, and each of the values of b1 and c1 may be set to half the data retransmission interval.

In the second example embodiment, the second base station may notify the second device of the values of b2 and c2 through higher-order layer signaling. More specifically, the notification of each of the values of b2 and c2 may be directly provided through higher-order layer signaling, and each of the values of b2 and c2 may be derived from a higher-layer signaled value. For example, the second base station may notify the second device of a data retransmission interval through higher-order layer signaling, and each of the values of b2 and c2 may be set to half the data retransmission interval.

3) Third Example Embodiment

Next, the third example embodiment of the data transmission/reception method in accordance with the present invention will be described.

Figure 8:
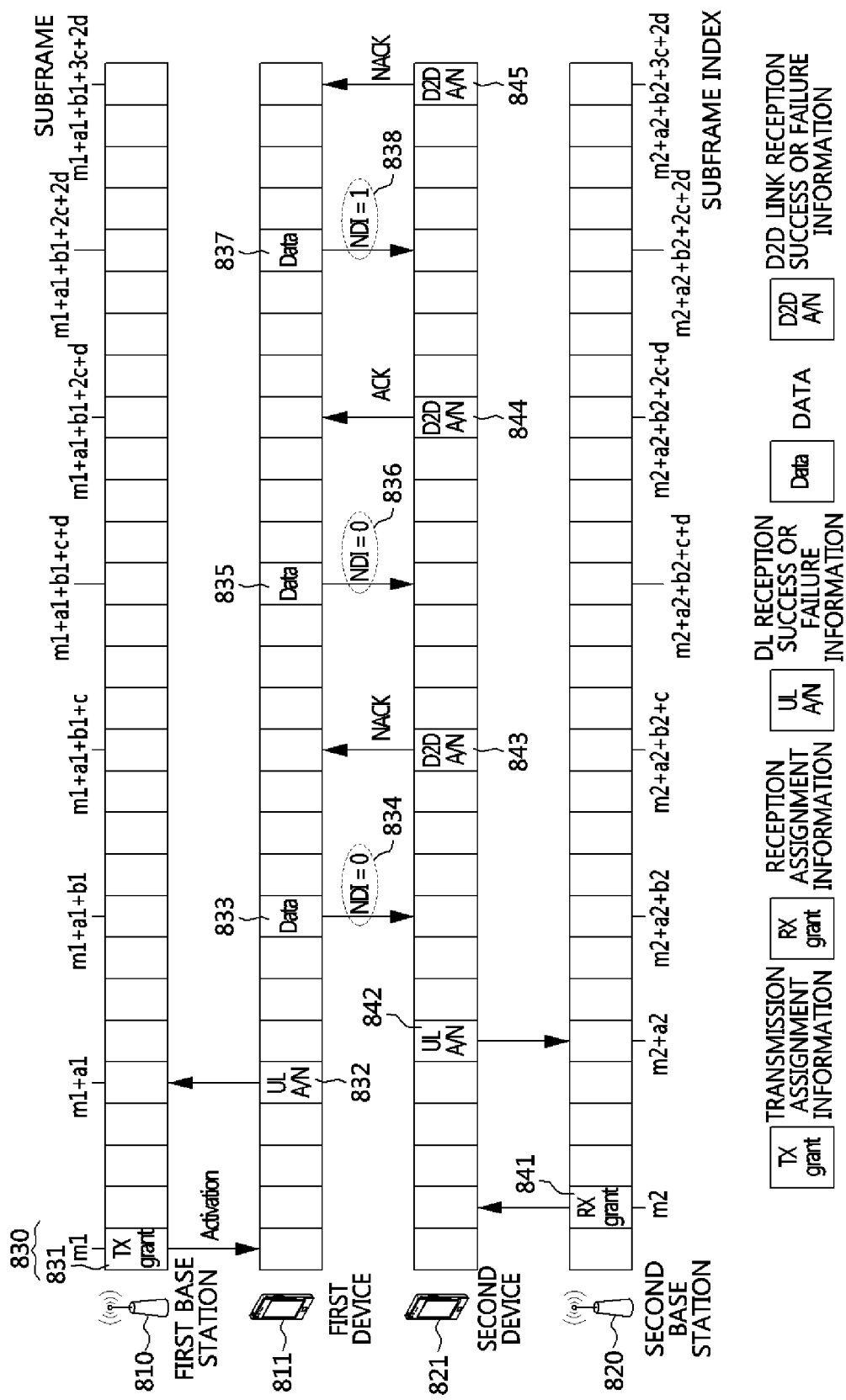
FIG. 8 is a subframe timing diagram illustrating a third example embodiment of the data transmission/reception method of the D2D communication in accordance with the present invention.

FIG. 8 is a subframe timing diagram illustrating the third example embodiment of the data transmission/reception method of the D2D communication in accordance with the present invention.

In the third example embodiment, there are two types of transmission assignment information 831 that is transmitted by a first base station 810 to a first device 811. One type is activation transmission assignment information indicating a scheduling start, and the other type is release transmission assignment information indicating a scheduling end.

When the first device 811 receives the transmission assignment information (activation or release), the first device transmits UL reception success or failure information 832 to the first base station after a1 subframes. Here, a value of a1 may be preset to a specific value, and the first base station may notify the first device of the specific value through higher-order layer signaling. The first base station demodulates the UL reception success or failure informational subframes after the transmission of the transmission assignment information.

When the first device receives the activation transmission assignment information, first device generates data 833 according to the activation transmission assignment information and transmits the data 833 to a second device 821. If the first device receives new activation transmission assignment information, the first device may be configured to ignore previously received activation transmission assignment information, generate data according to the new activation transmission assignment information, and transmit the generated data to the second device.

The activation transmission assignment information may include a combination of resource assignment information, modulation and coding information, transmission precoding matrix information, cyclic shift information, power control information, HARQ process number information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like. As mentioned in relation to the transmission assignment information of the first example embodiment, the activation transmission assignment information may be configured to selectively include the remaining information excluding core information such as the resource assignment information and the modulation and coding information according to a system configuration and a transmission format.

When the first device receives release transmission assignment information, the first device no longer transmits data to the second device after a subframe in which UL reception success or failure information for the release transmission assignment information has been transmitted.

The release transmission assignment information may include a combination of resource assignment information, modulation and coding information, transmission precoding matrix information, cyclic shift information, power control information, HARQ process number information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like. A value of some information among the above-described information may be set to a specific value. As mentioned above in relation to the transmission assignment information of the first example embodiment, the release transmission assignment information may be configured to selectively include the remaining information excluding core information such as the resource assignment information and the modulation and coding information according to a system configuration and a transmission format.

There are two types of reception assignment information 841 that is transmitted by a second base station 820 to the second device 821. One type is activation reception assignment information indicating a scheduling start, and the other type is release reception assignment information indicating a scheduling end.

When the second device 821 receives the reception assignment information (activation or release), the second device transmits UL reception success or failure information 842 to the second base station after a2 subframes. Here, a value of a2 may be preset to a specific value, and the second base station may notify the second device of the specific value through higher-order layer signaling. The second base station demodulates the UL reception success or failure information 842 a2 subframes after the transmission of the reception assignment information 841.

When the second device receives the activation reception assignment information, the second device demodulates data transmitted by the first device according to the activation reception assignment information. If the second device receives new activation reception assignment information, the second device may be configured to ignore previously received activation reception assignment information and demodulate data transmitted by the first device according to new activation reception assignment information.

The activation reception assignment information may include a combination of resource assignment information, modulation and coding information, transmission precoding matrix information, cyclic shift information, power control information, HARQ process number information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like.

As mentioned above in relation to the reception assignment information of the first example embodiment, the activation reception assignment information may be configured to selectively include the remaining information excluding core information such as the resource assignment information and the modulation and coding information according to a system configuration and a transmission format.

When the second device receives the release reception assignment information, the second device no longer demodulates data transmitted by the first device after a subframe in which the UL reception success or failure information has been transmitted.

The release reception assignment information may include a combination of resource assignment information, modulation and coding information, transmission precoding matrix information, cyclic shift information, power control information, HARQ process number information, carrier indicator information, frequency hopping indicator information, UL index information, DL assignment index information, channel state request information, resource assignment form information, SRS request information, precoding matrix decision information, DL power offset information, precoding information, scrambling information, number-of-layers information, antenna port information, and the like. A value of some information among the above-described information may be set to a specific value. As mentioned above in relation to the reception assignment information of the first example embodiment, the release reception assignment information may be configured to selectively include the remaining information excluding core information such as the resource assignment information and the modulation and coding information according to a system configuration and a transmission format.

When the first base station 810 transmits the transmission assignment information 831 to the first device 811, the second base station 820 constantly transmits reception assignment information 841 to the second device 821. If the first base station does not transmit the transmission assignment information to the first device, the second base station does not transmit the reception assignment information to the second device. A subframe in which the first base station transmits the transmission assignment information to the first device may be the same as or different from a subframe in which the second base station transmits the reception assignment information to the second device. The first base station may retransmit the transmission assignment information (activation or release) to the first device according to whether UL reception success or failure information transmitted by the first device has been successfully demodulated. The second base station may retransmit the reception assignment information (activation or release) to the second device according to whether UL reception success or failure information transmitted by the second device has been successfully demodulated.

The second device directly transmits D2D link reception success or failure information 843 to the first device according to whether data 833 transmitted by the first device has been successfully demodulated. D2D link reception success or failure information indicates two states of the ACK and the NACK.

When the second device has successfully demodulated the data 833 transmitted by the first device, D2D link reception success or failure information 843 is the ACK. When the second device has not successfully demodulated the data 833 transmitted by the first device, the D2D link reception success or failure information 843 is the NACK. When data includes a plurality of transport blocks, the D2D link reception success or failure information indicates the two states of the ACK and the NACK for each transport block.

When the state of the latest D2D link reception success or failure information received by the first device from the second device is the ACK, the first device transmits initial transmission data to the second device. When the state of the latest D2D link reception success or failure information received by the first device from the second device is the NACK, the first device transmits retransmission data to the second device. Here, retransmission is an operation of changing redundant version information and generating data using the latest received activation transmission assignment information. Here, the redundant version information is preset to a specific value according to how many times the retransmission has been performed. When the first device receives the activation transmission assignment information, data is generated and transmitted by constantly regarding first data, which is transmitted after the first device has received the activation transmission assignment information, as initial transmission data. Alternatively, when the first device receives the activation transmission assignment information, the first device may determine first data, which is transmitted after the first device has received the activation transmission assignment information, as initial transmission data or retransmission data, indicate the determined initial transmission data or retransmission data by the NDI information, and generate and transmit data. Here, when the first device determines the initial transmission or retransmission, the first device may use the latest received D2D link reception success or failure information.

The first device may notify the second device of whether data is initial transmission data or retransmission data through NDI information 834. Every time the first device transmits data to the second device, the first device transmits the NDI information 834 to the second device along with the data. The data and the NDI information are transmitted in the same subframe.

The NDI information has a value of 0 or 1. There are two methods of distinguishing initial transmission or retransmission of data through the NDI information.

The first method uses a toggle scheme. Every time the data is the initial transmission data, the NDI information is toggled. When the data is the retransmission data, the NDI information is not toggled. When the first device transmits first data after receiving the activation transmission assignment information, the NDI information may be preset to a specific value and the first device may select the value of 0 or 1.

The second method uses an assignment scheme. One value of 0 and 1 indicates initial transmission and the other value indicates retransmission. When data includes a plurality of transport blocks, the NDI information indicates initial transmission or retransmission for each transport block.

The second device demodulates data after first demodulating the NDI information 834 and determining whether the data 833 transmitted by the first device is initial transmission data or retransmission data. Here, retransmission is an operation of changing redundant version information and demodulating data using the latest received activation reception assignment information. Here, the redundant version information is preset to a specific value according to how many times the retransmission has been performed.

The first base station may transmit the activation transmission assignment information 831 to the first device in a subframe m1. When the first device receives the activation transmission assignment information in the subframe m1, the first device transmits the UL reception success or failure information 832 to the first base station in a subframe m1+a1. The first device generates data according to the latest received activation transmission assignment information (in a subframe m1+a1+b1) after b1 subframes from a subframe in which UL reception success or failure information has been transmitted, and transmits data 833 and NDI information 834 to the second device. Here, a value of b1 may be preset to a specific value, and the first base station may notify the first device of the specific value through higher-order layer signaling. Here, a method of distinguishing whether data is initial transmission data or retransmission data through NDI information is assumed to be the toggle scheme, and the NDI information is assumed to be 0 when first data is transmitted after the activation transmission assignment information has been received.

The second base station may transmit activation reception assignment information 841 to the second device in a subframe m2. When the second device receives the activation reception assignment information in the subframe m2, the second device transmits UL reception success or failure information 842 to the second base station in a subframe m2+a2. The second device demodulates data 833 transmitted by the first device according to the latest received activation reception assignment information (in a subframe m2+a2+b2) after b2 subframes from a subframe in which UL reception success or failure information has been transmitted and NDI information 834. Here, a value of b2 may be preset to a specific value, and the second base station may notify the second device of the specific value through higher-order layer signaling. The second device transmits D2D link reception success or failure information 843 to the first device (in a subframe m2+a2+b2+c) after c subframes from a subframe m2+a2+b2 in which data and NDI information have been received. Here, a value of c may be preset to a specific value, and the second base station may notify the second device of the specific value through higher-order layer signaling. Here, the state of the D2D link reception success or failure information 843 is assumed to be the NACK.

The first device demodulates the D2D link reception success or failure information 843 (in a subframe m1+a1+b1+c) after c subframes from a subframe m1+a1+b1 in which data and NDI information have been transmitted. Here, a value of c may be preset to a specific value, and the first base station may notify the first device of the specific value through higher-order layer signaling. The first device transmits data 835 and NDI information 836 to the second device (in a subframe m1+a1+b1+c+d) after d subframes from a subframe m1+a1+b1+c in which the D2D link reception success or failure information has been received. Here, a value of d may be preset to a specific value, and the first base station may notify the first device of the specific value through higher-order layer signaling. Here, the state of the D2D link reception success or failure information received by the first device is assumed to be the NACK. Accordingly, the first device generates retransmission data and transmits data and NDI information to the second device without toggling the NDI information.

The second device demodulates data 835 and NDI information 836 (in a subframe m2+a2+b2+c+d) after d subframes from a subframe m2+a2+b2+c in which D2D link reception success or failure information has been transmitted. Here, a value of d may be preset to a specific value, and the first base station may notify the first device of the specific value through higher-order layer signaling. The second device transmits D2D link reception success or failure information 844 to the first device (in a subframe m2+a2+b2+2c+d)c subframes after the reception of data and NDI information. Here, the state of the D2D link reception success or failure information is assumed to be the ACK.

The first device iterates the above process (844, 837, 838, and 845) according to the latest received activation transmission assignment information until release transmission assignment information is received. The second device iterates the above process (837, 838, and 845) according to the latest received activation reception assignment information until the release reception assignment information is received.

In the third example embodiment, the first base station may notify the first device of the values of a1, b1, c, and d through higher-order layer signaling. More specifically, the notification of each of the values of a1, b1, c, and d may be directly provided through higher-order layer signaling, and each of the values of a1, b1, c, and d may be derived from a higher-layer signaled value. For example, the first base station may notify the first device of a data retransmission interval through higher-order layer signaling, and each of the values of a1, b1, c, and d may be set to half the data retransmission interval.

In the third example embodiment, the second base station may notify the second device of the values of a2, b2, c, and d through higher-order layer signaling. More specifically, the notification of each of the values of a2, b2, c, and d may be directly provided through higher-order layer signaling, and each of the values of a2, b2, c, and d may be derived from a higher-layer signaled value. For example, the second base station may notify the second device of a data retransmission interval through higher-order layer signaling, and each of the values of a2, b2, c, and d may be set to half the data retransmission interval.

In the third example embodiment, it is assumed that the first device transmits NDI information simultaneously when transmitting data to the second device and does not transmit redundant version information. However, as another example embodiment, the first device may also transmit NDI information and redundant version information simultaneously when transmitting data to the second device. At this time, the second device demodulates data by distinguishing initial transmission and retransmission according to the NDI information, and distinguishing a redundant version of retransmission according to the redundant version information.

On the other hand, when the first device receives new activation transmission assignment information again after receiving activation transmission assignment information, the first device may be configured to ignore previously received activation transmission information and transmit data to the second device based on the new activation transmission assignment information.

In this case, first data transmission to the second device after the new activation transmission assignment information has been received may be configured to be constantly performed as initial transmission or retransmission.

Alternatively, first data transmission to the second device after the new activation transmission assignment information has been received may also be configured to be performed as initial transmission or retransmission based on reception success or failure information received from the second device for data previously transmitted to the second device (that is, data transmitted based on previously received activation transmission assignment information immediately before the new activation transmission assignment information is received). If there is no reception success or failure information previously received from the second device, data to be transmitted to the second device may be transmitted in initial transmission.

4) Fourth Example Embodiment

Next, the fourth example embodiment of the data transmission/reception method in accordance with the present invention will be described.

Figure 9:
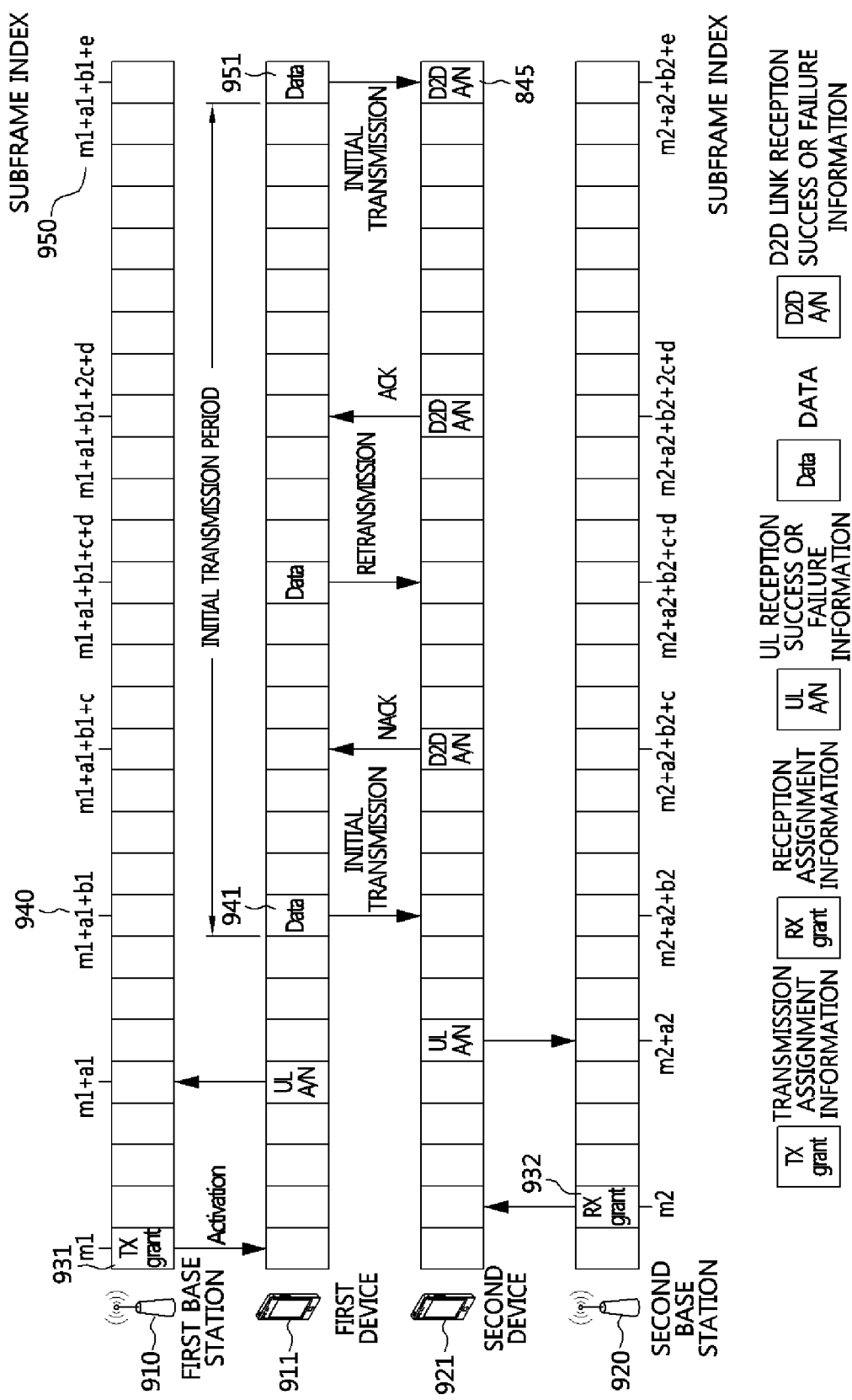
FIG. 9 is a subframe timing diagram illustrating a fourth example embodiment of the data transmission/reception method of the D2D communication in accordance with the present invention.

FIG. 9 is a subframe timing diagram illustrating the fourth example embodiment of the data transmission/reception method of the D2D communication in accordance with the present invention.

Because the fourth example embodiment basically follows the processes of the third example embodiment, differences between the fourth example embodiment and the third example embodiment will be mainly described hereinafter.

In the fourth example embodiment, the first device may transmit initial transmission data only in predetermined subframes (for example, 940 and 950). The first device transmits initial transmission data 941 to the second device (in a subframe m1+a1+b1 (940)) a1+b1 subframes after the reception of activation transmission assignment information 931. Thereafter, the first device transmits initial transmission data 951 to the second device in an initial transmission subframe (subframe m1+a1+b1+e (950)) according to initial transmission cycle information of the notification provided by the first base station through higher-order layer signaling. Accordingly, the first device may not transmit NDI information when transmitting data.

When a subframe in which the first device transmits initial transmission data is the same as a subframe in which D2D link reception or failure information is received, the first device transmits the initial transmission data without receiving the D2D link reception or failure information.

Data transmission of the first device may differ according to the state of the D2D link reception success or failure information received by the first device and whether a transmission subframe of initial transmission data is after d subframes from a subframe in which the D2D link reception success or failure information has been received.

First, the case in which the state of the D2D link reception success or failure information received by the first device is the ACK will be described. When the transmission subframe of the initial transmission data is after the d subframes from the subframe in which the D2D link reception success or failure information has been received, the first device transmits the initial transmission data to the second device. When the transmission subframe of the initial transmission data is not after the d subframes from the subframe in which the D2D link reception success or failure information has been received, the first device does not transmit data.

Next, the case in which the state of the D2D link reception success or failure information received by the first device is the NACK will be described. When the transmission subframe of the initial transmission data is after the d subframes from the subframe in which the D2D link reception success or failure information has been received, the first device transmits the initial transmission data. When the transmission subframe of the initial transmission data is not after the d subframes from the subframe in which the D2D link reception success or failure information has been received, the first device transmits retransmission data.

The second device demodulates the initial transmission data only in the predetermined subframes 940 and 950. The second device demodulates the initial transmission data 941 transmitted by the first device (in a subframe m2+a2+b2) a2+b2 subframes after activation reception assignment information 932 has been received. Thereafter, the second device demodulates initial transmission data 951 transmitted by the first device in an initial transmission subframe (subframe m2+a2+b2+e) according to initial transmission cycle information of the notification provided by the second base station through higher-layer signaling. Here, the second device does not demodulate NDI information. When a subframe in which the second device demodulates initial transmission data is the same as a subframe in which D2D link reception or failure information is transmitted, the second device demodulates the initial transmission data without transmitting the D2D link reception or failure information.

Data demodulation of the second device may differ according to the state of the D2D link reception success or failure information transmitted by the second device and whether a transmission subframe of initial transmission data is after d subframes from a subframe in which the D2D link reception success or failure information has been received.

First, the case in which the state of the D2D link reception success or failure information transmitted by the second device is the ACK will be described. When a demodulation subframe of the initial transmission data is after the d subframes from the subframe in which the D2D link reception success or failure information has been transmitted, the second device demodulates the initial transmission data transmitted by the first device. When the demodulation subframe of the initial transmission data is not after the d subframes from the subframe in which the D2D link reception success or failure information has been transmitted, the second device may not transmit D2D link reception success or failure information after c subframes subsequent thereto without demodulating data, and may transmit the D2D link reception success or failure information to the first device by setting the D2D link reception success or failure information to the ACK.

Next, the case in which the state of the D2D link reception success or failure information transmitted by the second device is the NACK will be described. When the transmission subframe of the initial transmission data is after the d subframes from the subframe in which the D2D link reception success or failure information has been transmitted, the second device demodulates the initial transmission data. When the transmission subframe of the initial transmission data is not after the d subframes from the subframe in which the D2D link reception success or failure information has been transmitted, the second device demodulates retransmission data.

In the first to fourth example embodiments, it is assumed that the first device transmits NDI information simultaneously when transmitting data to the second device and does not transmit redundant version information. However, as another example embodiment, the first device may also transmit NDI information and redundant version information simultaneously when transmitting data to the second device. At this time, the second device demodulates data by distinguishing initial transmission and retransmission according to the NDI information, and distinguishing a redundant version of retransmission according to the redundant version information.

5) Fifth Example Embodiment

Next, the fifth example embodiment of the data transmission/reception method in accordance with the present invention will be described.

In the fifth example embodiment, a process in which a link (second D2D link) through which the second device transmits D2D data to the first device is additionally activated in a state in which the first device transmits data to the second device (in a state in which D2D data transmission is performed through a first D2D link) in accordance with the third example embodiment will be described. Because the fifth example embodiment basically follows the processes of the third example embodiment, differences between the fifth example embodiment and the third example embodiment will be mainly described.

Figure 12:
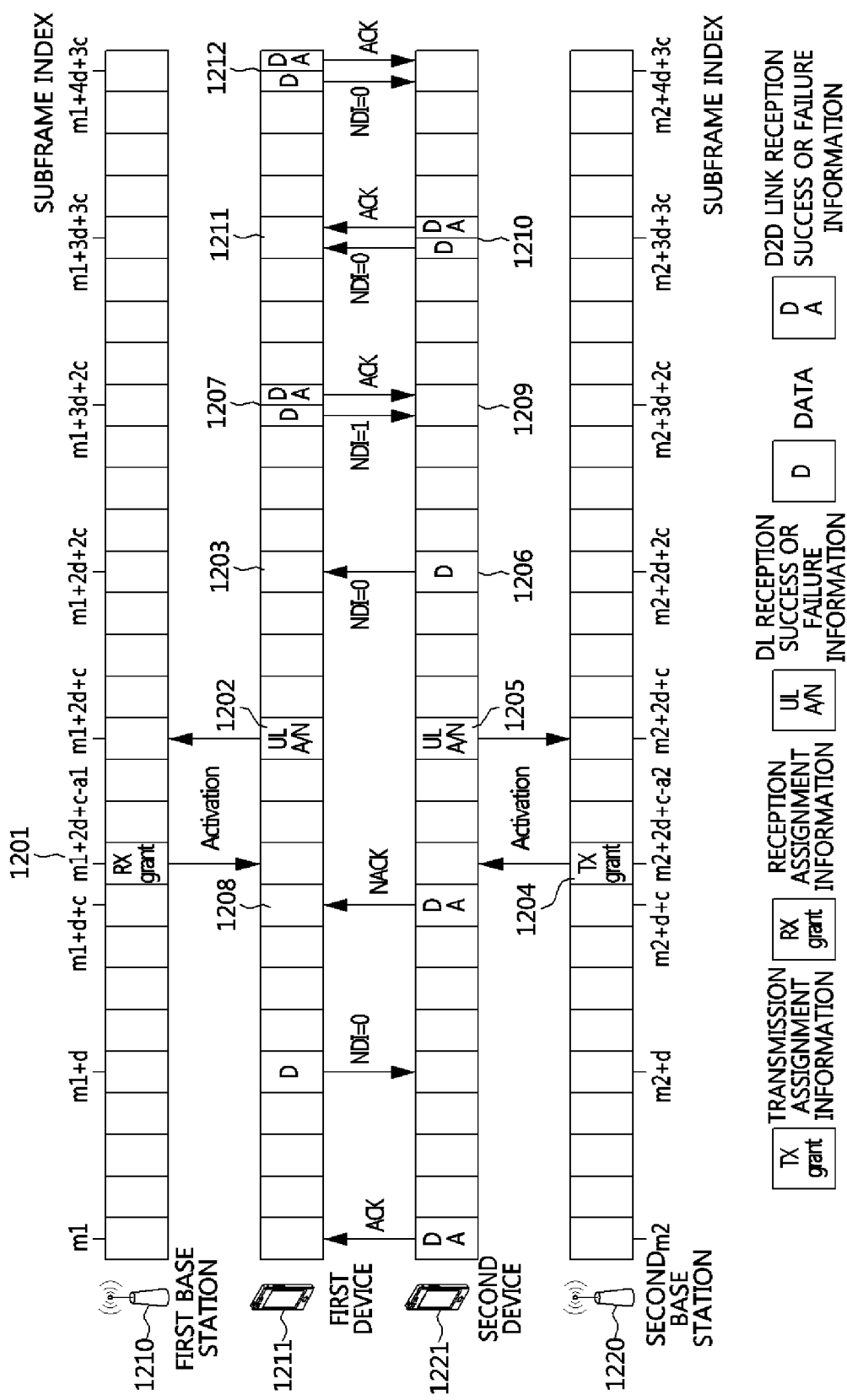
FIGS. 12 and 13 are subframe timing diagrams illustrating a fifth example embodiment of the data transmission/reception method of the D2D communication in accordance with the present invention.
Figure 13:
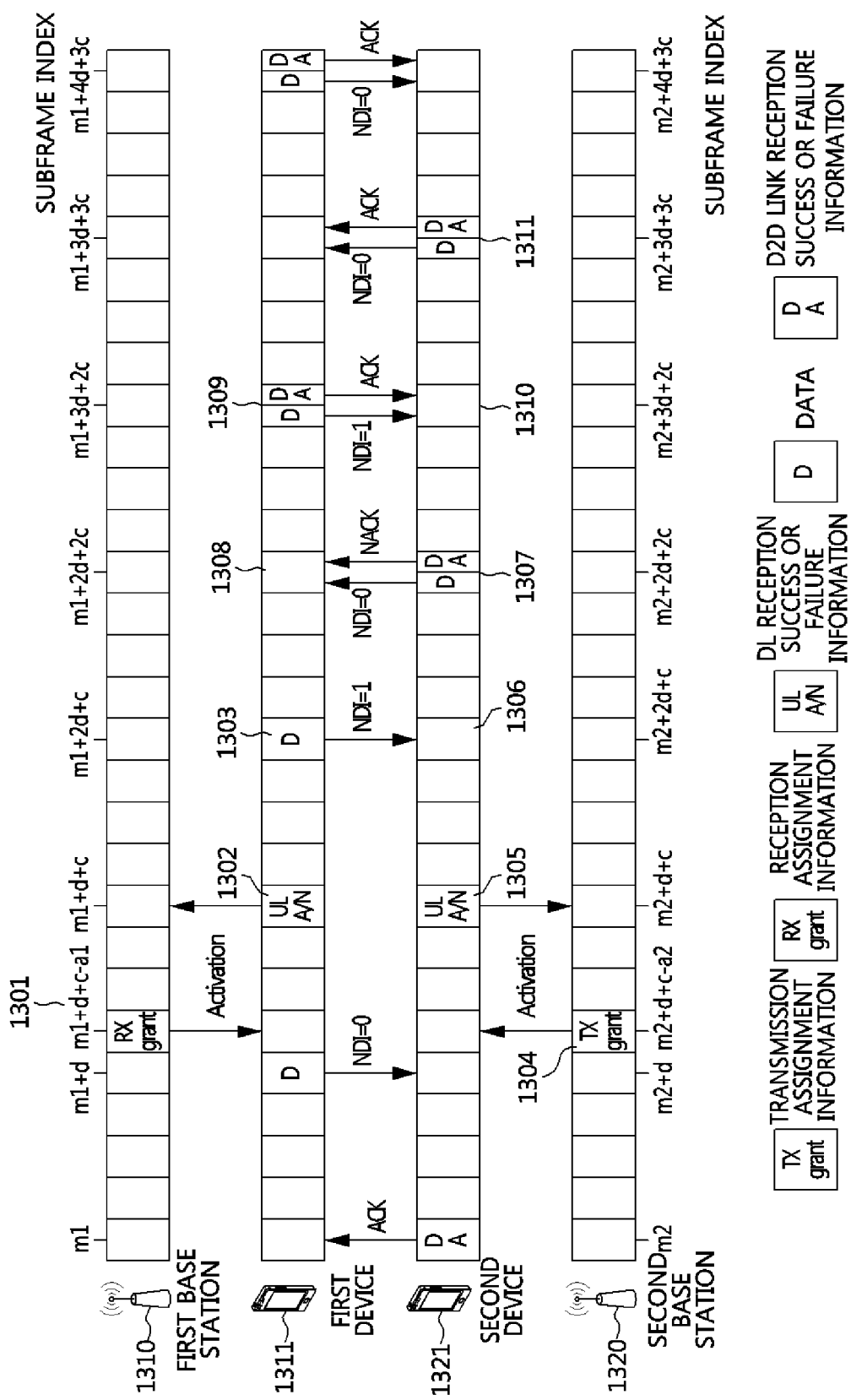

FIGS. 12 and 13 are subframe timing diagrams illustrating the fifth example embodiment of the data transmission/reception method of the D2D communication in accordance with the present invention.

In a process in which the first device receives activation reception assignment information of the second D2D link from the first base station, transmits UL reception success or failure information for activation transmission assignment information of the second D2D link to the first base station, and receives data of the second D2D link from the second device, the same scheme as in the first D2D link described in the third example embodiment may be applied. Also, in a process in which the second device receives activation reception assignment information of the first D2D link from the second base station, transmits UL reception success or failure information for activation transmission assignment information of the first D2D link to the second base station, and transmits data of the second D2D link to the first device, the same scheme as in the first D2D link described in the third example embodiment may be applied.

In addition, even in a process in which the first base station transmits activation reception assignment information of the second D2D link to the first device and a process in which the second base station transmits activation transmission assignment information of the second D2D link to the second device, the same scheme as in the first D2D link described in the third example embodiment may be applied. In a state of D2D link reception success or failure information transmitted by the first device to the second device and a state determination, the same scheme as in the third example embodiment may be applied. In the determination of initial transmission or retransmission of data of the second D2D link according to the state of the second D2D link reception success or failure information received by the second device from the first device and the determination of an NDI information state of the second D2D link, the same scheme as in the third example embodiment may be applied. Even in a process in which the first device distinguishes whether the data of the second D2D link is the initial transmission data or retransmission data through the NDI information of the second D2D link received from the second device and applies redundant version information, the same scheme as in the third example embodiment may be applied.

On the other hand, when the second D2D link is additionally activated in a state in which the first D2D link is in operation as described in the third example embodiment, a state in which subframes in which the operation of the first D2D link is performed overlap subframes in which the operation of the second D2D link is performed may occur. Representatively, a state in which a subframe in which whether UL reception success or failure information for the activation transmission assignment information of the second D2D link has succeeded is transmitted or a subframe in which whether UL reception success or failure information for the activation reception assignment information of the second D2D link has succeeded is transmitted overlaps a subframe in which the operation of the first D2D link is performed (a subframe in which data is transmitted or a subframe in which reception success or failure information for the data is transmitted) may be problematic.

First, when a subframe in which the first device transmits UL reception success or failure information for activation reception assignment information of the second D2D link received from the first base station overlaps a subframe in which data of the first D2D link is transmitted or when a subframe in which the second device transmits UL reception success or failure information for activation transmission assignment information of the second D2D link received from the second base station overlaps a subframe in which data of the first D2D link is received, data transmission/reception processes of the second D2D link and the first D2D link will be described with reference to FIG. 12.

In FIG. 12, it is assumed that an assignment scheme is used for NDI information of the first D2D link and NDI information of the second D2D link.

The first base station may transmit the activation reception assignment information of the second D2D link to the first device in a subframe m1+2d+c−a1 (1201). When the first device receives the activation reception assignment information of the second D2D link in the subframe m1+2d+c−a1 (1201), the first device transmits UL reception success or failure information for the activation reception assignment information of the second D2D link to the first base station in a subframe m1+2d+c (1202). At this time, a state in which the subframe m1+2d+c (1202) overlaps a data transmission frame of the first D2D link in accordance with the above-described third example embodiment may occur. That is, when a subframe in which UL reception success or failure information for activation reception assignment information of the second D2D link received from the first base station is transmitted overlaps a subframe in which data of the first D2D link is transmitted, the first device preferentially performs the transmission of the UL reception success or failure information for the reception assignment information of the second D2D link received from the first base station rather than the transmission of data to the second device.

The first device demodulates data of the second D2D link transmitted by the second device according to the activation reception assignment information of the second D2D link and the NDI information of the second D2D link (in a subframe m1+2d+2c 1203) after c subframes from the subframe 1202 in which the UL reception success or failure information has been transmitted.

On the other hand, the second base station may transmit the activation transmission assignment information of the second D2D link to the second device in a subframe m2+2d+c−a2 (1204). When the second device receives the activation transmission assignment information of the second D2D link in the subframe m2+2d+c−a2 (1204), the second device transmits UL reception success or failure information for the activation transmission assignment information of the second D2D link to the second base station in a subframe m2+2d+c (1205). At this time, a state in which the subframe m2+2d+c (1205) overlaps a data reception frame of the first D2D link in accordance with the above-described third example embodiment may occur. That is, when a subframe in which the UL reception success or failure information for the activation transmission assignment information of the second D2D link received from the second base station is transmitted overlaps a subframe in which data of the first D2D link is received, the second device preferentially performs the reception of the UL reception success or failure information for the transmission assignment information of the second D2D link received from the second base station rather than the reception of data from the first device.

The second device generates data of the second D2D link according to the activation transmission assignment information of the second D2D link (in a subframe m2+2d+2c (1206)) after c subframes from the subframe 1205 in which the UL reception success or failure information has been transmitted, and transmits the data of the second D2D link and NDI information of the second D2D link to the first device.

At this time, data of the second D2D link (data to be transmitted in the subframe m2+2d+2c (1206)) to be first transmitted to the first device based on the activation transmission assignment information of the second D2D link received by the second device may be transmitted as initial transmission or retransmission. That is, when the second device has received new activation transmission assignment information (activation transmission assignment information of the second D2D link), data to be first transmitted in correspondence therewith may be configured to be constantly transmitted as initial transmission or retransmission.

Alternatively, it may be determined whether the data transmission of the second D2D link is the initial transmission or retransmission according to the latest reception success or failure information of the second D2D link received by the second device. If there is no previously received reception success or failure information of the second D2D link, the data of the second D2D link may be transmitted as the initial transmission. Here, the NDI information of the second D2D link is assumed to be 0 indicating the initial transmission.

The first device transmits the reception success or failure information of the second D2D link to the second device (in a subframe m1+3d+2c (1207)) after d subframes from the subframe m1+2d+2c (1203) in which data of the second D2D link and NDI information of the second D2D link have been received. Here, the state of the reception success or failure information of the second D2D link is assumed to be the ACK. Also, the first device transmits data of the first D2D link and NDI information of the first D2D link to the second device in the subframe m1+3d+2c (1207).

At this time, after the first device receives activation reception assignment information of the second D2D link and transmits UL reception success or failure information therefor, first data transmission of the first D2D link to be transmitted to the second device (that is, data transmission of the subframe 1207) may be initial transmission or retransmission. That is, when the first device has received new activation reception assignment information (activation reception assignment information of the second D2D link), data of the first D2D link to be first transmitted to the second device thereafter (data to be transmitted in the subframe m1+3d+2c (1207)) may be configured to be constantly transmitted as the initial transmission or retransmission.

Alternatively, it may be determined whether the data transmission of the first D2D link to be first performed after the first device has received new activation reception assignment information (activation reception assignment information of the second D2D link) is initial transmission or retransmission according to the latest reception success or failure information of the first D2D link received by the first device (for example, reception success or failure information received in a subframe m1+d+c (1208)). The first device indicates whether data of the first D2D link is initial transmission data or retransmission data in NDI information of the first D2D link. Here, the NDI information of the first D2D link is assumed to be 1 indicating the retransmission.

The second device demodulates the reception success or failure information of the second D2D link (in a subframe m2+3d+2c (1209)) after d subframes from the subframe m2+2d+2c (1206) in which data of the second D2D link and NDI information of the second D2D link have been received. Also, the second device demodulates data of the first D2D link transmitted by the first device according to NDI information of the first D2D link in the subframe m2+3d+2c (1209). The second device transmits data of the second D2D link and NDI information of the second D2D link to the first device (in a subframe m2+3d+3c (1210)) after c subframes from the subframe m2+3d+2c (1209) in which the second D2D link reception success or failure information has been received. Here, the state of the reception success or failure information of the second D2D link received by the second device is assumed to be the ACK. Accordingly, the second device generates initial transmission data, sets NDI information of the second D2D link to 0, and transmits the data of the second D2D link and the NDI information of the second D2D link to the first device. Also, the second device transmits the reception success or failure information of the first D2D link to the first device in the subframe m2+3d+3c (1210). Here, the state of the reception success or failure information of the first D2D link is assumed to be the ACK.

The first device demodulates data of the second D2D link transmitted by the second device according to NDI information of the second D2D link in a subframe m1+3d+3c (1211) after c subframes from the subframe m1+3d+2c (1207) in which reception success or failure information of the second D2D link has been transmitted. Also, the first device demodulates reception success or failure information of the first D2D link in the subframe m1+3d+3c (1211). The first device transmits the reception success or failure information of the second D2D link to the second device (in a subframe m1+4d+3c (1212)) after d subframes from a subframe m1+3d+3c in which the data of the second D2D link and the NDI information of the second D2D link have been received. Here, the state of the reception success or failure information of the first D2D link is assumed to be the ACK. Also, the first device transmits the data of the first D2D link and the NDI information of the first D2D link to the second device in the subframe m1+4d+3c (1212). Here, the NDI information of the first D2D link is assumed to be 0 indicating the initial transmission.

Thereafter, the first device and the second device iterate the above process until the release transmission assignment information or the release reception assignment information of the first D2D link or the second D2D link is received.

Next, when a subframe in which the first device transmits UL reception success or failure information corresponding to activation reception assignment information of the second D2D link received from the first base station overlaps a subframe in which reception success or failure information of the first D2D link is received or when a subframe in which the second device transmits UL reception success or failure information corresponding to activation transmission assignment information of the second D2D link received from the second base station overlaps a subframe in which reception success or failure information of the first D2D link is transmitted, data transmission/reception processes of the second D2D link and the first D2D link will be described with reference to FIG. 13.

In FIG. 13, it is assumed that an assignment scheme is used for NDI information of the first D2D link and NDI information of the second D2D link.

The first base station may transmit the activation reception assignment information of the second D2D link to the first device in a subframe m1+d+c−a1 (1301). When the first device receives the activation reception assignment information of the second D2D link in the subframe m1+d+c−a1, the first device transmits UL reception success or failure information corresponding to the activation reception assignment information of the second D2D link to the first base station in a subframe m1+d+c (1302). At this time, a state in which the subframe m1+d+c (1302) overlaps a subframe in which the reception success or failure information of the first D2D link should be received from the second device in accordance with the above-described third example embodiment may occur. That is, when a subframe in which UL reception success or failure information for activation reception assignment information of the second D2D link is received from the first base station overlaps a subframe in which reception success or failure information for data transmitted through the first D2D link is received from the second device, the first device preferentially performs the transmission of UL reception success or failure information for the activation reception assignment information of the second D2D link received from the second base station rather than the reception of reception success or failure information from the second device.

Because the first device has not received reception success or failure information for data of the first D2D link transmitted to the second device from the second device in a subframe m1+d, the first device may not transmit data of the first D2D link in a subframe m1+2d+c (1303) after d subframes from a subframe in which UL reception success or failure information has been transmitted so as to prevent unnecessary power consumption. The first device may transmit data of the first D2D link to the second device in a subframe m1+3d+2c based on reception success or failure information for data of the first D2D link after receiving the reception success or failure information for the data of the first D2D link in a subframe m1+2d+2c.

In addition, the first device may transmit the data of the first D2D link in the subframe m1+2d+c (1303). At this time, the first device initially transmits or retransmits data of the first D2D link (that is, data of the subframe 1303) to be first transmitted after receiving the activation reception assignment information of the second D2D link. That is, the first device may be configured so that the data of the first D2D link to be first transmitted after receiving new activation reception assignment information (the activation reception assignment information of the second D2D link) is constantly transmitted in initial transmission or retransmission.

Alternatively, after the first device has received activation reception assignment information of the second D2D link, it may be determined whether first data transmission of the first D2D link is initial transmission or retransmission according to the latest reception success or failure information of the first D2D link received by the first device. The first device indicates whether the data of the first D2D link is initial transmission data or retransmission data in NDI information of the first D2D link. Here, the NDI information of the first D2D link is assumed to be 1 indicating retransmission.

The second base station may transmit the activation transmission assignment information of the second D2D link to the second device in a subframe m2+d+c−a2 (1304). The second device transmits UL reception success or failure information for the activation transmission assignment information of the second D2D link to the second base station in a subframe m2+d+c (1305). At this time, a state in which the subframe m2+d+c (1305) overlaps a reception success or failure information transmission subframe of the first D2D link in accordance with the above-described third example embodiment may occur. That is, when a subframe in which UL reception success or failure information for activation transmission assignment information of the second D2D link received from the second base station is transmitted overlaps a subframe in which reception success or failure information for data received through the first D2D link is transmitted to the first device, the second device preferentially transmits UL reception success or failure information for the activation transmission assignment information of the second D2D link received from the second base station without transmitting reception success or failure information to the first device.

The second device may demodulate data of the first D2D link transmitted by the first device according to the NDI information of the first D2D link (in a subframe m2+2d+c (1306)) after d subframes from a subframe in which the UL reception success or failure information has been transmitted. In addition, because the first device may not transmit the data of the first D2D link to the second device in a subframe m1+2d+c, the second device may not demodulate data of the first D2D link transmitted by the first device in the subframe m2+2d+c (1306).

The second device transmits the reception success or failure information of the first D2D link to the first device in a subframe m2+2d+2c (1307) after c subframes from the subframe m2+2d+c (1306) in which data of the first D2D link is received or not received. At this time, the reception success or failure information of the first D2D link is determined according to the data demodulation result of the first D2D link latest received by the second device. Here, the state of the reception success or failure information of the first D2D link is assumed to be the NACK. Also, the second device transmits data of the second D2D link and NDI information of the second D2D link to the first device in the subframe m2+2d+2c 1307. At this time, the data of the second D2D link may be constantly transmitted as initial transmission or retransmission. Alternatively, it may be determined whether the data transmission of the second D2D link is the initial transmission or retransmission according to the latest reception success or failure information received by the second device. If there is no previously received reception success or failure information of the second D2D link, the data of the second D2D link may be transmitted in the initial transmission. Here, the NDI information of the second D2D link is assumed to be 0 indicating the initial transmission.

The first device demodulates the reception success or failure information of the first D2D link in a subframe m1+2d+2c (1308) after c subframes from a subframe m1+2d+c (1303) in which data of the first D2D link and NDI information of the first D2D link are transmitted or not transmitted. Also, the first device demodulates data of the second D2D link transmitted by the second device according to NDI information of the second D2D link in the subframe m1+2d+2c (1308). The first device transmits data of the first D2D link and NDI information of the first D2D link to the second device in a subframe m1+3d+2c (1309) after d subframes from the subframe m1+2d+2c (1308) in which the reception success or failure information of the first D2D link has been received. Here, the state of the reception success or failure information of the first D2D link received by the first device is assumed to be the NACK. Accordingly, the first device generates retransmission data, sets NDI information of the first D2D link to 1, and transmits the data of the first D2D link and the NDI information of the first D2D link to the second device. Also, the first device transmits the reception success or failure information of the second D2D link to the second device in the subframe m1+3d+2c (1309). Here, the state of the reception success or failure information of the second D2D link is assumed to be the ACK. The first device transmits the reception success or failure information of the second D2D link to the second device in the subframe m1+3d+2c (1309) after d subframes from the subframe m1+2d+2c (1308) in which data of the second D2D link and NDI information of the second D2D link have been received. Here, the state of the reception success or failure information of the second D2D link is assumed to be the ACK. Also, the first device transmits data of the first D2D link and NDI information of the first D2D link to the second device in the subframe m1+3d+2c (1309). At this time, it is determined whether the data transmission of the first D2D link is initial transmission or retransmission according to the latest reception success or failure information of the first D2D link received by the first device. The first device indicates whether data of the first D2D link is initial transmission data or retransmission data in NDI information of the first D2D link. Here, the NDI information of the first D2D link is assumed to be 1 indicating the retransmission.

The second device demodulates data of the first D2D link transmitted by the first device according to NDI information of the first D2D link in a subframe m2+3d+2c (1310) after d subframes from the subframe m2+2d+2c (1307) in which reception success or failure information of the first D2D link has been transmitted. Also, the second device demodulates reception success or failure information of the second D2D link in the subframe m2+3d+2c (1310). The second device transmits the reception success or failure information of the first D2D link to the first device in a subframe m2+3d+3c (1311) after c subframes from the subframe m2+3d+2c (1310) in which the data of the first D2D link and the NDI information of the first D2D link have been received. Here, the state of the reception success or failure information of the first D2D link is assumed to be the ACK. Also, the second device transmits the data of the second D2D link and the NDI information of the second D2D link to the first device in the subframe m2+3d+3c (1311). Here, the NDI information of the second D2D link is assumed to be 0 indicating the initial transmission.

Thereafter, the first device and the second device iterate the above process until the release transmission assignment information or the release reception assignment information of the first D2D link or the second D2D link is received.

In the fifth example embodiment, it is assumed that the second device transmits NDI information of the second D2D link simultaneously when transmitting data of the second D2D link to the first device and does not transmit redundant version information. However, as another example embodiment, the second device may also transmit NDI information of the second D2D link and redundant version information of the second D2D link simultaneously when transmitting data of the second D2D link to the first device. At this time, the first device demodulates data by distinguishing initial transmission and retransmission according to the NDI information of the second D2D link and distinguishing a redundant version of retransmission according to the redundant version information of the second D2D link.

6) Sixth Example Embodiment

Next, the sixth example embodiment of the data transmission/reception method in accordance with the present invention will be described.

Figure 14:
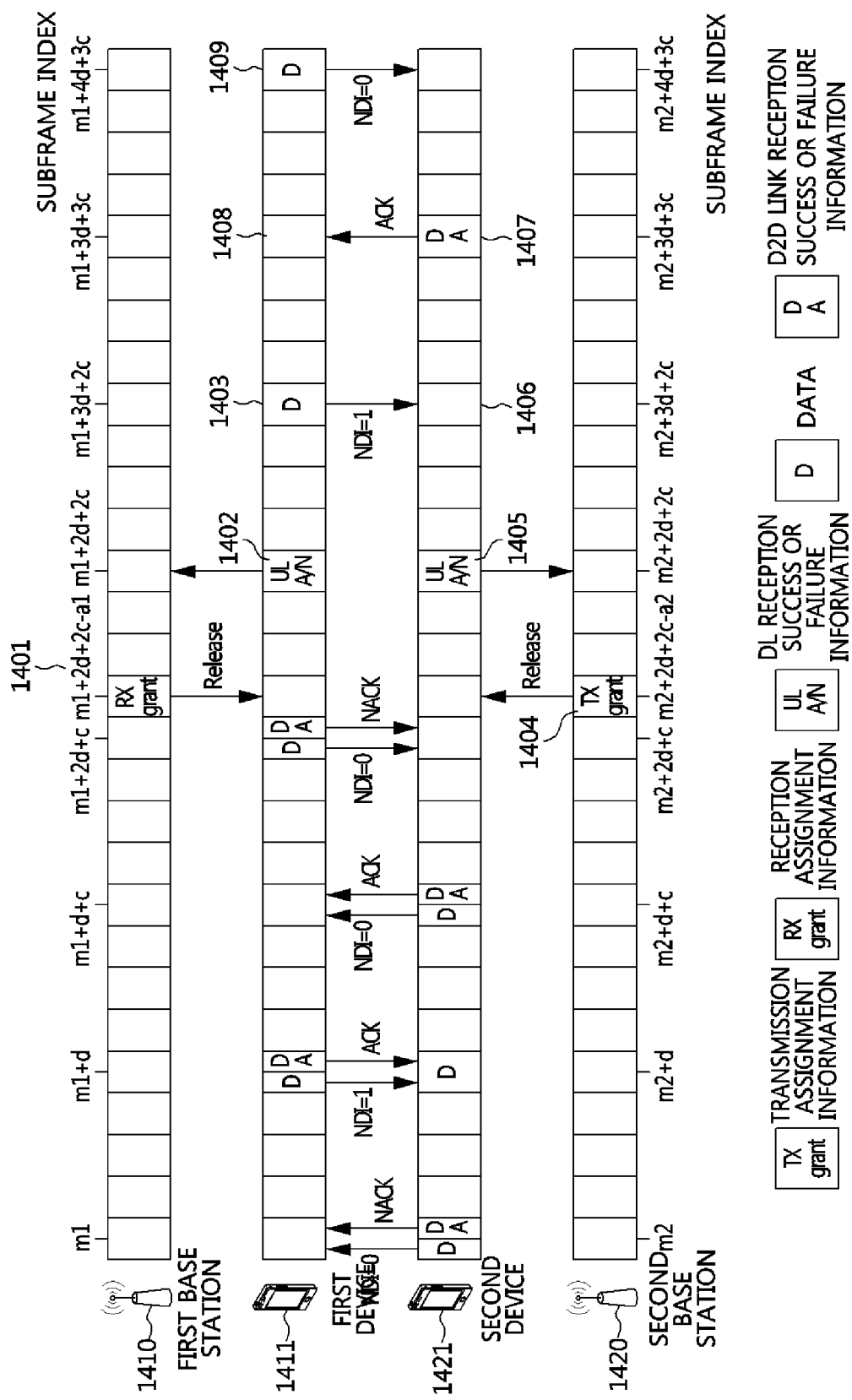
FIG. 14 is a subframe timing diagram illustrating a sixth example embodiment of the data transmission/reception method of the D2D communication in accordance with the present invention.

FIG. 14 is a subframe timing diagram illustrating the sixth example embodiment of the data transmission/reception method of the D2D communication in accordance with the present invention. In FIG. 14, it is assumed that an assignment scheme is used for NDI information of the first D2D link and NDI information of the second D2D link.

A process of releasing data transmission/reception of the second D2D link in a state in which the first device transmits data to the second device (through the first D2D link) and the second device transmits data to the first device (through the second D2D link) in the sixth example embodiment will be described like in the fifth example embodiment. Unless otherwise defined, a process of releasing data transmission/reception of the first D2D link in a state in which data of the first and second D2D links is transmitted and received may be equally applied as in a process of releasing data transmission/reception of the second D2D link as will be described later. Because the sixth example embodiment basically follows the processes of the third and fifth example embodiments, differences between the sixth example embodiment and the third and fifth example embodiments will be mainly described.

A process in which the first device receives release reception assignment information of the second D2D link from the first base station, transmits UL reception success or failure information for the release reception assignment information of the second D2D link to the first base station, and does not receive data of the second D2D link from the second device is the same as in the third example embodiment. In addition, a process in which the second device receives release transmission assignment information of the second D2D link from the second base station, transmits UL reception success or failure information for the release transmission assignment information of the second D2D link to the second base station, and does not transmit data of the second D2D link to the first device is also the same as in the third example embodiment. In addition, a process in which the first base station transmits the release reception assignment information to the first device and a process in which the second base station transmits the release transmission assignment information to the second device are the same as in the third example embodiment.

The first base station may transmit the release reception assignment information of the second D2D link to the first device in a subframe m1+2d+2c−a1 (1401). When the first device receives the release reception assignment information of the second D2D link in the subframe m1+2d+2c−a1 (1401), the first device transmits UL reception success or failure information for the release reception assignment information of the second D2D link to the first base station in a subframe m1+2d+2c (1402).

At this time, a state in which the subframe m1+2d+2c (1402) overlaps a subframe in which reception success or failure information of the first D2D link should be received from the second device in accordance with the above-described third example embodiment may occur. That is, when a subframe in which UL reception success or failure information for release reception assignment information of the second D2D link received from the first base station is transmitted overlaps a subframe in which reception success or failure information for data transmitted through the first D2D link is received from the second device, the first device preferentially performs the transmission of UL reception success or failure information for the release reception assignment information of the second D2D link received from the second base station rather than reception of the reception success or failure information from the second device.

Because the first device has not received reception success or failure information for data of the first D2D link transmitted to the second device from the second device in a subframe m1+2d+c, the first device may not transmit the data of the first D2D link in a subframe m1+3d+2c (1403) after d subframes from a subframe in which UL reception success or failure information has been transmitted so as to prevent unnecessary power consumption. After receiving reception success or failure information for the data of the first D2D link in a subframe m1+3d+3c, the first device may transmit data of the first D2D link to the second device in a subframe m1+4d+3c based on the reception success or failure information for the data of the first D2D link.

In addition, the first device may transmit data of the first D2D link in a subframe m1+3d+2c (1403). At this time, the data of the first D2D link to be transmitted in the subframe m1+3d+2c (1403) after d subframes from a subframe in which UL reception success or failure information has been transmitted may be constantly transmitted as initial transmission or retransmission.

Alternatively, it may be determined whether data of the first D2D link to be transmitted in the subframe m1+3d+2c (1403) after d subframes from a subframe in which UL reception success or failure information has been transmitted is initial transmission data or retransmission data according to the latest reception success or failure information of the first D2D link received by the first device. The first device indicates whether the data of the first D2D link is initial transmission data or retransmission data in NDI information of the first D2D link. Here, the NDI information of the first D2D link is assumed to be 1 indicating retransmission.

The second base station may transmit the release transmission assignment information of the second D2D link to the second device in a subframe m2+2d+2c−a2 (1404). The second device transmits UL reception success or failure information for the release transmission assignment information of the second D2D link to the second base station in a subframe m2+2d+2c (1405).

The second device may demodulate data of the first D2D link transmitted by the first device according to NDI information of the first D2D link in a subframe m2+3d+2c (1406) after d subframes from a subframe in which UL reception success or failure information has been transmitted. Alternatively, because the first device may not transmit data of the first D2D link to the second device in the subframe m1+3d+2c, the second device may not demodulate the data of the first D2D link transmitted by the first device in the subframe m2+3d+2c (1406). The second device transmits reception success or failure information of the first D2D link to the first device in a subframe m2+3d+3c (1407) after c subframes from the subframe m2+3d+2c (1406) in which the data of the first D2D link has been received. At this time, the reception success or failure information of the first D2D link is determined according to the data demodulation result of the first D2D link latest received by the second device. Here, the state of the reception success or failure information of the first D2D link is assumed to be the ACK.

The first device demodulates reception success or failure information of the first D2D link in a subframe m1+3d+3c (1408) after c subframes from the subframe m1+3d+2c (1403) in which the data of the first D2D link has been transmitted. The first device transmits data of the first D2D link and NDI information of the first D2D link to the second device in a subframe m1+4d+3c (1409) after d subframes from the subframe m1+3d+3c (1408) in which reception success or failure information of the first D2D link has been received. Here, the state of the reception success or failure information of the first D2D link received by the first device is assumed to be the ACK. Accordingly, the first device generates initial transmission data, sets NDI information of the first D2D link to 0, and transmits data of the first D2D link and the NDI information of the first D2D link to the second device.

Thereafter, the first device and the second device iterate the above process until the release transmission assignment information of the first D2D link and the release reception assignment information of the first D2D link are received.

Information described in the above-described first to sixth example embodiments will be additionally described. In 3GPP, higher-order layer signaling may be radio resource control (RRC) signaling. Transmission assignment information and reception assignment information is transmitted through a DL physical control channel. In 3GPP, the transmission assignment information and the reception assignment information may be DL control information (DCI), and a DL physical control channel may be a PDCCH or enhanced PDCCH (E-PDCCH). Data is transmitted through a UL physical data channel. In 3GPP, the UL physical data channel may be a PUSCH. DL reception success or failure information is transmitted through a DL HARQ indicator channel. In 3GPP, DL reception success or failure information may be an HARQ indicator (HI), and a DL HI channel may be a physical HI channel (PHICH) or enhanced PHICH (E-PHICH). UL reception success or failure information may be transmitted through a UL physical control channel or a UL physical data channel. In 3 GPP, the UL reception success or failure information may be UL control information (UCI) HARQ-ACK, and the UL physical control channel may be a PUCCH.

Buffer State Report Method of D2D Communication

When the first device transmits data to the second device, the first device may transmit D2D buffer state information for a link from the first device to the second device to the first base station. In addition, when the second device transmits data to the first device, the second device may transmit D2D buffer state information for a link from the second device to the first device to the second base station.

Hereinafter, the D2D buffer state information for the link from the first device to the second device will be described. The D2D buffer state information for the link from the first device to the second device may be equally applied to the D2D buffer state information for the link from the second device to the first device.

When the first device transmits data to the first base station in a subframe in which the first device transmits the D2D buffer state information, the D2D buffer state information is transmitted along with data. When the first device does not transmit data to the first base station in the subframe in which the first device transmits the D2D buffer state information, the first device may request the first base station to provide resources. After the first base station receives the resource request from the first device, the first base station may transmit UL assignment information to the first device. The first device transmits the D2D buffer state information according to the UL assignment information transmitted by the first base station.

The first device manages a D2D buffer state information timer. The first base station transmits a D2D buffer state information timer value to the first device through higher-order layer signaling. The D2D buffer state information timer is initialized every time the first device transmits data to the second device. When the D2D buffer state information timer expires, the first device triggers the D2D buffer state information and sets a value of the D2D buffer state information to 0.

Power Control of D2D Communication

Next, the power control of the D2D communication will be described.

Hereinafter, a D2D physical control channel (D2D-PCCH) is a control channel to be transmitted through a D2D link, and a D2D physical shared channel (D2D-PSCH) is a data channel to be transmitted through the D2D link.

When UE transmits only the D2D-PSCH without transmitting the D2D-PCCH in a (i) subframe i of a serving cell c, transmission power $P_{D2D-PSCH,c}(i)$ [dBm] of the D2D-PSCH in the subframe i of the serving cell c may be determined as shown in the following Equation (1).

$$P_{D2D-PSCH,c}(i) = \min \begin{Bmatrix} P_{CMAX-D2D,c}(i), \\ 10\log_{10}(M_{D2D-PSCH,c}(i)) + P_{O\_D2D-PSCH,c}(j) + \\ \alpha_{D2D,c}(j) \cdot PL_{D2D,c} + \Delta_{TF-D2D,c}(i) + f_{D2D,c}(i) \end{Bmatrix} \quad (1)$$

Here, $P_{CMAX-D2D,c}(i)$ is maximum transmission power of the UE in the subframe i of the serving cell c. The UE determines $P_{CMAX-D2D,c}(i)$ in consideration of $P_{EMAX-D2D}$, maximum power reduction (MPR), additional MPR (A-MPR), power management MPR (P-MPR), P_PowerClass, and a delta TC. An eNB notifies the UE of $P_{EMAX-D2D,c}$ as UE-specific setting information of the serving cell c through radio resource control (RRC) signaling.

$M_{D2D-PSCH,c}(i)$ represents the number of resource blocks (RBs) assigned to the D2D-PSCH in the subframe i of the serving cell c.

$P_{O\_D2D-PSCH,c}(j)$ includes a sum of $P_{O\_NOMINAL\_D2D-PSCH,c}(j)$ which is cell-specific setting information, and $P_{O\_UE\_D2D-PSCH,c}(j)$, which is UE-specific setting information. The eNB notifies the UE of $P_{O\_NOMINAL\_D2D-PSCH,c}(j)$ and $P_{O\_UE\_D2D-PSCH,c}(j)$ through RRC signaling. Here, j has a value of 0, 1, and 2, j=0 indicates the case in which the D2D-PSCH corresponds to semi-persistent scheduling (SPS), j=1 indicates the case in which the D2D-PSCH corresponds to dynamic scheduling, and j=2 indicates the case in which the D2D-PSCH corresponds to random access channel (RACH) message 3.

$PL_{D2D,c}$ which is a path loss estimation value of the D2D link, is calculated as follows. $PL_{D2D,c}=P_{PM-SRS,c}$–L3 filtered D2D-RSRP, where $P_{PM-SRS,c}$, which is transmission power of the PM-SRS, will be described in detail later. L3 filtered D2D-RSRP which is a D2D-reference signal received power (RSRP) of the PM-SRS, is an L3-filtered value.

$\alpha_{D2D,c}(j)$, which is a path loss estimation value, has a value between 0 and 1. The eNB notifies the UE of $\alpha_{D2D,c}(j)$ as UE-specific setting information through RRC signaling.

$\Delta_{TF-D2D,c}(i)$ has a value that differs according to a modulation and coding scheme (MCS) of the D2-PSCH in the subframe i of the serving cell c. The eNB notifies the UE of whether to include $\Delta_{TF-D2D,c}(i)$ as UE-specific setting information in D2D-PSCH power control through RRC signaling.

$f_{D2D,c}(i)$ is a value that is determined according to a transmit power control (TPC) command in the subframe i of the serving cell c.

When the UE simultaneously transmits the D2D-PCCH and the D2D-PSCH in the subframe i of the serving cell c, the transmission power $P_{D2D-PSCH,c}(i)$ [dBm] of the D2D-PSCH in the subframe i of the serving cell c is determined as shown in the following Equation (2).

$$P_{D2D-PSCH,c}(i) = \min \begin{Bmatrix} 10\log_{10}(\hat{P}_{CMAX-D2D,c}(i) - \hat{P}_{D2D-PCCH}(i)), \\ 10\log_{10}(M_{D2D-PSCH,c}(i)) + P_{O\_D2D-PSCH,c}(j) + \\ \alpha_{D2D,c}(j) \cdot PL_{D2D,c} + \Delta_{TF-D2D,c}(i) + f_{D2D,c}(i) \end{Bmatrix} \quad (2)$$

$\hat{P}_{CMAX-D2D,c}(i)$ is a linear value of $P_{CMAX-D2D,c}(i)$.
$\hat{P}_{D2D-PCCH}(i)$, which is a linear value of $P_{D2D-PCCH}(i)$, will be described in detail below.

When the UE does not transmit the D2D-PSCH in the subframe i of the serving cell c, the transmission power $P_{D2D-PSCH,c}(i)$ [dBm] of the D2D-PSCH in the subframe i of the serving cell c for the accumulation of the TPC command is assumed to be defined as the following Equation (3)

$$P_{D2D-PSCH,c}(i) = \min\{P_{CMAX-D2D,c}(i), P_{O\_D2D-PSCH,c}(j) + \alpha_{D2D,c}(j) \cdot PL_{D2D,c} + f_{D2D,c}(i)\} \quad (3)$$

When the UE transmits the D2D-PCCH in the subframe i of the serving cell c, transmission power $P_{D2D-PCCH,c}(i)$ [dBm] of the D2D-PCCH in the subframe i of the serving cell c may be determined as shown in the following Equation (4).

$$P_{D2D-PCCH,c}(i) = \min \begin{Bmatrix} P_{CMAX-D2D,c}(i), \\ P_{O\_D2D-PSCH,c} + PL_{D2D,c} + \Delta_{F\_D2D-PCCH,c}(F) + \\ \Delta_{TxD-D2D,c} + g_{D2D,c}(i) \end{Bmatrix} \quad (4)$$

$P_{CMAX\_D2D,c}(i)$ and $PL_{D2D,c}$ are the same as described above.

$P_{O\_D2D-PCCH,c}$ includes a sum of $P_{O\_NOMINAL\_D2D-PCCH,c}$, which is cell-specific setting information, and $P_{O_{UE}\_D2D-PCCH,c}$ which is UE-specific setting information. The eNB notifies the UE of $P_{O\_NOMINAL\_D2D-PCCH,c}$ and $P_{O\_UE\_D2D-PCCH,c}$ through RRC signaling.

$\Delta_{F\_D-PUCCH,c}(F)$ has a value that differs according to a D2D-PCCH format F. The eNB notifies the UE of $\Delta_{F\_D-PUCCH,c}(F)$, which is cell-specific setting information in the serving cell c, through RRC signaling Details of the D2D-PCCH format will be described below.

$\Delta_{TxD-D2D,c}$ is applied only when the UE transmits the D2D-PCCH using two antenna ports. When the UE transmits the D2D-PCCH using one antenna port, $\Delta_{TxD-D2D,c}=0$. The eNB notifies the UE of $\Delta_{TxD-D2D,c}$, which is UE-specific setting information of the serving cell, c through RRC signaling.

$g_{D2D,c}(i)$ is a value that is determined according to a TPC command in the subframe of the serving cell c.

Transmission power $P_{CSI-SRS,c}(i)$ [dBm] of a CSI-SRS in the subframe i of the serving cell c is determined as shown in the following Equation (5).

$$P_{CSI-SRS,c}(i) = \min\begin{Bmatrix} P_{CMAX-D2D,c}(i), \\ P_{CSI-SRS\_OFFSET,c}(m) + 10\log_{10}(M_{CSI-SRS,c}(i)) + \\ P_{O\_D-PUSCH,c}(j) + \alpha_{D2D,c}(j) \cdot PL_{D2D,c} + f_{D2D,c}(i) \end{Bmatrix} \quad (5)$$

$P_{CMAX-D2D,c}(i)$, $P_{O\_D-PUSCH,c}(j)$, $PL_{D2D,c}$, $\alpha_{D2D,c}(i)$ and $f_{D2D,c}(i)$ are the same as described above.

$P_{CSI-SRS\_OFFSET,c}(m)$ is a value indicating a power offset with the D2D-PSCH in the serving cell c. Here, m has a value of 0 and 1, m=0 indicates a CSI-SRS trigger type 0, and m=1 indicates a CSI-SRS trigger type 1. The eNB notifies the UE of $P_{CSI-SRS\_OFFSET,c}(m)$, which is UE-specific setting information of the serving cell, c through RRC signaling. Details of the CSI-SRS trigger types will be described below.

$M_{CSI-SRS,c}(i)$ represents the number of RBs assigned to a CSI-SRS in the subframe i of the serving cell c.

Transmission power $P_{PM-SRS,c}(i)$ [dBm] of a PM-SRS in the subframe i of the serving cell c is determined as shown in the following Equation (6).

$$P_{PM-SRS,c}(i) = \min\{P'_{CMAX-D2D,c}(i), 10 \log_{10}(M_{PM-SRS,c}(i)) + P_{O\_PM-SRS,c}\} \quad (6)$$

$P'_{CMAX-D2D,c}(i)$ is maximum transmission power of the UE in the subframe i of the serving cell c. The UE determines $P'_{CMAX-D2D,c}(i)$ in consideration of $P_{EMAX-D2D}$, MPR, A-MPR, P-MPR, P_PowerClass, and a delta TC. The eNB notifies the UE of $P'_{EMAX-D2D,c}$ as UE-specific setting information of the serving cell c through RRC signaling.

$M_{PM-SRS,c}(i)$ represents the number of RBs assigned to the PM-SRS in the subframe i of the serving cell c.

$P_{O\_PM-SRS,c}$ includes a sum of $P_{O\_NOMINAL\_PM-SRS,c}$, which is cell-specific setting information in the serving cell c, and $P_{O\_UE\_PM-SRS,c}$, which is UE-specific setting information. The eNB notifies the UE of $P_{O\_NOMINAL\_PM-SRS,c}$ and $P_{O\_UE\_PM-SRS,c}$ through RRC signaling.

The UE transmits a D2D-PHR to the eNB so that the eNB controls transmission power of the UE. The D2D-PHR represents the remaining power after the UE transmits a D2D physical channel at its own maximum transmission power.

The D2D-PHR includes a periodic D2D-PHR and an aperiodic D2D-PHR. First, the periodic D2D-PHR will be described. The e-NB may notify the UE of a cycle of the periodic D2D-PHR and a subframe offset through RRC signaling. The UE transmits the periodic D2D-PHR to the eNB through the PUCCH according to RRC signaling.

Next, the aperiodic D2D-PHR will be described. The eNB may request the UE to transmit the aperiodic D2D-PHR through a TX grant. After six subframes from the subframe in which the aperiodic D2D-PHR request has been received, the UE transmits the aperiodic D2D-PHR to the eNB through the PUSCH.

In the D2D-PHR, there are a mode 1 and a mode 2. When the eNB sets the mode 2 for the UE, the UE transmits the D2D-PHR of the mode 2 to the eNB. Otherwise, the UE transmits the D2D-PHR of the mode 1 to the eNB. The eNB transmits the setting information of the mode 2 as UE-specific setting information to the UE through RRC signaling.

There are two types of D2D-PHRs. First, a D2D-PHR type 1 considers only transmission power of the D2D-PSCH. Next, a D2D-PHR type 2 considers both the transmission power of the D2D-PSCH and transmission power of the D2D-PCCH. When simultaneous transmission of the D2D-PSCH and the D2D-PUCCH is set, the UE transmits the D2D-PHR type 2 to the eNB. Otherwise, the UE transmits the D2D-PHR type 1 to the eNB.

The UE transmits neither the D2D-PSCH nor the D2D-PCCH in a subframe i in which the D2D-PHR is reported. First, the D2D-PHR type 1 and the D2D-PHR type 2 of the mode 1 will be described. The D2D-PHR type 1 $PH_{type1-D2D,c}(i)$ [dBm] in the subframe of the serving cell c is determined as shown in the following Equation (7).

$$PH_{type1-D2D,c}(i) = \tilde{P}_{CMAX-D2D,c}(i) - \{P_{O\_D2D-PSCH,c}(j) + \alpha_{D2D,c}(j) \cdot PL_{D2D,c} + f_{D2D,c}(i)\} \quad (7)$$

The D2D-PHR type 2 $PH_{type2-D2D,c}(i)$ [dBm] in the subframe i of the serving cell c is determined as shown in the following Equation (8).

$$PH_{type2-D2D}(i) = \tilde{P}_{CMAX-D2D,c}(i) - \quad (8)$$

$$10\log_{10}\left(\begin{matrix} 10^{(P_{O\_D2D-PSCH,c}(j)+\alpha_{D2D,c}(j)\cdot PL_{D2D,c}+f_{D2D,c}(i))/10} + \\ 10^{(P_{O\_D2D-PCCH,c}+PL_{D2D,c}+g_{D2D,c}(i))/10} \end{matrix}\right)$$

Next, a D2D-PHR type 1 and a D2D-PHR type 2 of the mode 2 will be described. First, the D2D-PHR type 1 will be described. When the latest channel transmitted by the UE in the subframe i of the serving cell c is only the D2D-PSCH between the D2D-PCCH and the D2D-PSCH, the D2D-PHR type 1 $PH_{type1-D2D,c}(i)$ [dBm] in the subframe i of the serving cell c is determined as shown in the following Equation (9).

$$PH_{type1-D2D,c}(i) = \quad (9)$$
$$P_{CMAX-D2D,c}(i) - \left\{\begin{matrix} 10\log_{10}(M_{D2D-PSCH,c}(i)) + P_{O\_D2D-PSCH,c}(j) + \\ \alpha_{D2D,c}(j) \cdot PL_{D2D,c} + \Delta_{TF-D2D,c}(i) + f_{D2D,c}(i) \end{matrix}\right\}$$

Here, a value of the latest transmitted D2D-PSCH in the subframe i is applied to $M_{D2D-PSCH,c}(i)$ and $\Delta_{TF-D2D,c}(i)$.

When the latest transmission of the D2D-PCCH and the D2D-PSCH by the UE in the subframe i of the serving cell c is simultaneous transmission of the D2D-PCCH and the D2D-PSCH, PSCH, the D2D-PHR type 1 [dBm] in the subframe i of the serving cell c is determined as shown in the following Equation (10).

$$PH_{type1\text{-}D2D,c}(i) = \qquad (10)$$

$$\tilde{P}_{CMAX\text{-}D2D,c}(i) - \begin{Bmatrix} 10\log_{10}(M_{D2D\text{-}PSCH,c}(i)) + P_{O\_D2D\text{-}PSCH,c}(j) + \\ \alpha_{D2D,c}(j) \cdot PL_{D2D,c} + \Delta_{TF\text{-}D2D,c}(i) + f_{D2D,c}(i) \end{Bmatrix}$$

Here, a value of the latest transmitted D2D-PSCH in the subframe i is applied to $M_{D2D\text{-}PSCH,c}(i)$ and $\Delta_{TF\text{-}D2D,c}(i)$.

Next, the D2D-PHR type 2 will be described. When the latest transmission of the D2D-PCCH and the D2D-PSCH by the UE in the subframe i of the serving cell c is simultaneous transmission of the D2D-PCCH and the D2D-PSCH, the D2D-PHR type 2 $PH_{type2\text{-}D2D,c}(i)$ [dBm] in the subframe i of the serving cell c is determined as shown in the following Equation (11).

$$PH_{type2\text{-}D2D,c}(i) = P_{CMAX\text{-}D2D,c}(i) - \qquad (11)$$

$$10\log_{10}\begin{pmatrix} 10^{\left(10\log_{10}(M_{D2D\text{-}PSCH,c}(i))+P_{O\_D2D\text{-}PSCH,c}(j)+\atop \alpha_{D2D,c}(j)\cdot PL_{D2D,c}+\Delta_{TF\text{-}D2D,c}(i)+f_{D2D,c}(i)\right)/10} + \\ 10^{\left(P_{O\_D2D\text{-}PSCH,c}+PL_{D2D,c}+\Delta_{F\_D2D\text{-}PCCH,c}(F)+\atop \Delta_{TxD\text{-}D2D,c}+g_{D2D,c}(i)\right)/10} \end{pmatrix}$$

Here, values of the latest transmitted D2D-PSCH and D2D-PCCH in the subframe i are applied to $M_{D2D\text{-}PSCH,c}(i)$, $\Delta_{TF\text{-}D2D,c}(i)$, and $\Delta_{F\_D2D\text{-}PCCH,c}(F)$.

When the latest channel transmitted by the UE in the subframe i of the serving cell c is only the D2D-PSCH between the D2D-PCCH and the D2D-PSCH, the D2D-PHR type 2 $PH_{type2\text{-}D2D,c}(i)$ [dBm] in the subframe i of the serving cell c is determined as shown in the following Equation (12).

$$PH_{type2\text{-}D2D,c}(i) = P_{CMAX\text{-}D2D,c}(i) - \qquad (12)$$

$$10\log_{10}\begin{pmatrix} 10^{\left(10\log_{10}(M_{D2D\text{-}PSCH,c}(i))+P_{O\_D2D\text{-}PSCH,c}(j)+\atop \alpha_{D2D,c}(j)\cdot PL_{D2D,c}+\Delta_{TF\text{-}D2D,c}(i)+f_{D2D,c}(i)\right)/10} + \\ 10^{(P_{O\_D2D\text{-}PSCH,c}+PL_{D2D,c}+g_{D2D,c}(i))/10} \end{pmatrix}$$

Here, a value of the latest transmitted D2D-PSCH in the subframe i is applied to $M_{D2D\text{-}PSCH,c}(i)$ and $\Delta_{TF\text{-}D2D,c}(i)$.

When the latest channel transmitted by the UE in the subframe i of the serving cell c is only the D2D-PCCH between the D2D-PCCH and the D2D-PSCH, the D2D-PHR type 2 $PH_{type2\text{-}D2D,c}(i)$[dBm] in the subframe i of the serving cell c is determined as shown in the following Equation (13).

$$PH_{type2\text{-}D2D,c}(i) = P_{CMAX\text{-}D2D,c}(i) - \qquad (13)$$

$$10\log_{10}\begin{pmatrix} 10^{(P_{O\_D2D\text{-}PSCH,c}(j)+\alpha_{D2D,c}(j)\cdot PL_{D2D,c}+f_{D2D,c}(i))/10} + \\ 10^{\left(P_{O\_D2D\text{-}PSCH,c}+PL_{D2D,c}+\Delta_{F\_D2D\text{-}PCCH,c}(F)+\atop \Delta_{TxD\text{-}D2D,c}+g_{D2D,c}(i)\right)/10} \end{pmatrix}$$

Here, a value of the latest transmitted D2D-PCCH in the subframe i is applied to $\Delta_{F\_D2D\text{-}PCCH,c}(F)$.

$P_{CMAX\text{-}D2D,c}(i)$, $M_{D2D\text{-}PSCH,c}(i)$, $P_{O\_D2D\text{-}PSCH,c}(i)$, $PL_{D2D,c}$, $\alpha_{D2D,c}(j)$, $\Delta_{TF\text{-}D2D,c}(i)$, and $f_{D2D,c}(i)$ are the same as described above.

$P_{O\_D2D\text{-}PCCH,c}$, $\Delta_{F\_D2D\text{-}PCCH,c}(F)$, $\Delta_{TxD\text{-}D2D,c}$, and $g_{D2D,c}(i)$ have been described above.

$\tilde{P}_{CMAX\text{-}D2D,c}(i)$ is assumed to be transmitted only on the D2D-PSCH in the subframe i of the serving cell c. The UE determines $P_{CMAX\text{-}D2D,c}(i)$ in consideration of $P_{EMAX\text{-}D2D,c}$, MPR, A-MPR, P-MPR, P_PowerClass, and delta TC.

D2D-CSI Report Method

Hereinafter, the CSI report method described in the above-described 'SRS transmission/reception control and CSI transmission/reception methods' will be specifically described in detail.

Hereinafter, the CSI of the D2D link for the D2D communication as CSI is referred to as D2D-CSI, and an SRS to be transmitted between devices for the generation of the D2D-CSI is referred to as a CSI-SRS.

FIG. 10 is a conceptual diagram illustrating a CSI report method for the D2D communication in accordance with an example embodiment of the present invention.

Referring to FIG. 10, a base station 1010 transmits CSI-SRS setting information 1020 and 1021 to a first device 1011 and a second device 1012 through RRC signaling. This is the same procedure as described in the above-described 'SRS transmission/reception control and CSI transmission/reception methods for adaptive transmission.' That is, the CSI-SRS setting information may be SRS transmission setting information or SRS reception setting information.

On the other hand, the base station may be configured to additionally transmit CSI report setting information 1030 (D2D-CSI report setting information) to the second device through RRC signaling.

As described in the above-described SRS transmission/reception control method, the first device transmits a CSI-SRS 1040 using the CSI-SRS setting information 1020 received from the base station.

The second device also receives the CSI-SRS transmitted by the first device using CSI-SRS setting information 1021 received from the base station. The second device 1012 transmits CSI generated using the received CSI-SRS as a D2D-CSI report 1050 to the base station 1010.

Although an example in which the first device 1011 and the second device 1012 receive setting information from the same base station 1010 and report CSI to the same base station is illustrated in FIG. 10, the first and second devices may be configured to receive setting information from different base stations or report CSI to different base stations.

Hereinafter, a CSI report method based on the second device will be described, but the same procedure may also be performed for the first device.

The second device calculates a D2D-CSI based on a CSI-SRS received from the first device and transmits a D2D-CSI report to the base station based on D2D-CSI report setting information.

First, the CSI-SRS includes a periodic CSI-SRS and an aperiodic CSI-SRS. The periodic CSI-SRS is periodically iteratively transmitted, and the aperiodic CSI-SRS is transmitted only once. For example, a CSI-SRS trigger type 0 may be configured to indicate the aperiodic CSI-SRS and a CSI-SRS trigger type 1 may be configured to indicate the periodic CSI-SRS.

The CSI-SRS setting information may include cell-specific CSI-SRS information and device-specific CSI-SRS information. For this, parameters defined in LTE are used.

The device-specific CSI-SRS information may be srs-Bandwidth, srs-HoppingBandwidth, freqDomainPosition, srs-ConfigIndex, cyclicShift, transmissionComb, duration, srs-AntennaPort, and the like, and the cell-specific CSI-SRS information may be srs-BandwidthConfig, srs-Subframe- Config, srs-MaxUpPts, and the like. The periodic CSI-SRS setting information may be different from the aperiodic CSI-SRS setting information.

Next, the D2D-CSI report includes a periodic D2D-CSI report and an aperiodic D2D-CSI report.

FIG. 11 is a conceptual diagram illustrating a periodic CSI report method in the CSI report method for the D2D communication in accordance with an example embodiment of the present invention.

Referring to FIG. 11, a device transmits an RI, a PMI, and a CQI in different cycles P1 and P2 through the PUCCH or PUSCH in the periodic D2D-CSI report method.

For example, first, the device transmits the RI to the base station. Next, the device transmits the CQI to the base station assuming that the RI is most recently reported to the base station. Here, only the CQI is transmitted when the transmission mode (TM) of the D2D-PSCH is a TM 1, and the CQI and the PMI are transmitted when the TM of the D2D-PSCH is a TM 2.

The periodic D2D-CSI report setting information includes a CQI transmission cycle, a CQI offset, an RI transmission cycle, and an RI offset.

In FIG. 11, the CQI transmission cycle, the CQI offset, the RI transmission cycle, and the RI offset are denoted by P1, Offset_CQI, P2, and Offset_RI, respectively. The CQI offset is set based on a subframe #0 of SFN #0, and the R1 offset is set based on the CQI offset. Because the R1 is long-term information, it is preferable to set a transmission cycle of the R1 that is greater than the transmission cycle of the CQI. Accordingly, the transmission cycle P2 of the RI may be configured to be a multiple of the transmission cycle P1 of the CQI.

Next, in the aperiodic D2D-CSI report, UE transmits all information of the R1, the PMI, and the CQI through the PUSCH.

An eNB may request the UE to transmit an aperiodic D2D-CSI report. The UE receiving the aperiodic D2D-CSI report request transmits all information of the RI, the PMI, and the CQI through the PUSCH in the same subframe based on the aperiodic D2D-CSI report setting information.

In the future, cellular network-based D2D communication of a form in which a cellular mobile communication scheme and a D2D communication scheme are combined is expected to be widespread.

When the above-described D2D communication method in accordance with the above-described example embodiment of the present invention is used, channel state measurement of a D2D link, data transmission/reception of the D2D link, and power control of the D2D link are possible in cellular-based D2D communication.

In particular, the present invention provides cellular network-based D2D communication methods optimized for a Third Generation Partnership Project (3GPP) Long Term Evolution (LTE) system. Technologies of the present invention are also applicable to various cellular mobile communication systems as well as the 3GPP LTE system.

While the example embodiments of the present invention and their advantages have been described in detail, it should be understood that various changes, substitutions and alterations may be made herein without departing from the scope of the invention.

What is claimed is:

1. A data transmission/reception method of a first device for device-to-device (D2D) communication, comprising:
receiving activation reception assignment information of a first D2D link from a base station in a first subframe;
transmitting whether the activation reception assignment information of the first D2D link has been successfully received to the base station in a second subframe after a predetermined number (m) of subframes from the first subframe; receiving data of the first D2D link from a second device based on the activation reception assignment information of the first D2D link in a third subframe after a predetermined number (n) of the subframes from the second subframe; and
transmitting information indicating whether the data of the first D2D link has been successfully received to the second device in a fourth subframe after a first predetermined number (o) of the subframes from the third subframe,
wherein it is determined whether the data received from the second device after a second predetermined number (p) of the subframes from the fourth subframe is initial transmission data or retransmission data based on the information indicating whether the data of the first D2D link has been successfully received.

2. The data transmission/reception method of claim 1, further comprising:
receiving release reception assignment information of the first D2D link from the base station; and
transmitting whether the release reception assignment information has been successfully received to the base station in a subframe after a predetermined number of subframes from a subframe in which the release reception assignment information of the first D2D link has been received.

3. The data transmission/reception method of claim 1, further comprising:
receiving activation transmission assignment information of a second D2D link from the base station in a fifth subframe; and
transmitting whether the activation transmission assignment information of the second D2D link has been successfully received to the base station in a sixth subframe after a predetermined number (m2) of subframes from the fifth subframe,
wherein, when the sixth subframe collides with the second subframe, the transmission of whether the activation transmission assignment information of the second D2D link has been successfully received rather than reception of data of the first D2D link is preferentially performed.

4. The data transmission/reception method of claim 3, further comprising:
transmitting data of the second D2D link to the second device based on the activation transmission assignment information of the second D2D link in a seventh subframe after a predetermined number (n2) of subframes from the sixth subframe.

5. The data transmission/reception method of claim 4, wherein in the sixth subframe, the data of the second D2D link is transmitted to the second device, and buffer state information of the second D2D link is transmitted to the base station.

6. The data transmission/reception method of claim 4, wherein the data of the second D2D link and reception success or failure information for the data of the first D2D link received from the second device are transmitted to the second device in the sixth subframe.

7. The data transmission/reception method of claim 4, wherein, when the transmission of the data of the second D2D link is first transmission based on the activation transmission assignment information of the second D2D link, the transmission of the data of the second D2D link is constantly performed as initial transmission or retransmission.

8. The data transmission/reception method of claim 4, wherein, when the transmission of the data of the second D2D link is first transmission based on the activation transmission assignment information of the second D2D link, the transmission of the data of the second D2D link is performed as initial transmission or retransmission based on reception success or failure information received from the second device for previously transmitted data of the second D2D link.

9. The data transmission/reception method of claim 1, further comprising:
receiving activation transmission assignment information of a second D2D link from the base station in a fifth subframe; and
transmitting whether the activation transmission assignment information of the second D2D link has been successfully received to the base station in a sixth subframe after a predetermined number (m2) of subframes from the fifth subframe,
wherein, when the sixth subframe collides with the fourth subframe, the transmission of whether the activation transmission assignment information of the second D2D link has been successfully received rather than the transmission of reception success or failure information for the data of the first D2D link is preferentially performed.

10. The data transmission/reception method of claim 9, further comprising:
transmitting the data of the second D2D link to the second device based on the activation transmission assignment information of the second D2D link in a seventh subframe after a predetermined number (n2) of subframes from the sixth subframe.

11. A data transmission/reception method of a first device that performs data transmission to a second device through a first D2D link and data reception from the second device through a second D2D link, comprising:
receiving release transmission assignment information of the first D2D link or release reception assignment information of the second D2D link from a base station in a first subframe;
transmitting whether the release transmission assignment information or the release reception assignment information has been successfully received to the base station in a second subframe after a predetermined number (x) of subframes from the first subframe; and
when the second subframe collides with a subframe, in which reception of reception success information or reception failure information from the second device for data transmitted to the second device is performed, or when the second subframe collides with the subframe, in which transmission of reception success information or reception failure information for the data received from the second device is performed, preferentially transmitting whether or not either the release transmission assignment information or the release reception assignment information has been successfully received.

12. The data transmission/reception method of claim 11, wherein first data of the second D2D link through the second D2D link after the release transmission assignment information of the first D2D link has been received is constantly received as initial transmission or retransmission.

13. The data transmission/reception method of claim 11, wherein the first data of the second D2D link through the second D2D link after the release transmission assignment information of the first D2D link has been received is constantly received as initial transmission or retransmission based on whether previously received data of the second D2D link has been successfully received.

14. The data transmission/reception method of claim 11, wherein first data of the first D2D link through the first D2D link after the release reception assignment information of the second D2D link has been received is constantly transmitted as initial transmission or retransmission.

15. The data transmission/reception method of claim 11, wherein the first data of the first D2D link through the first D2D link after the release reception assignment information of the second D2D link has been received is constantly transmitted as initial transmission or retransmission based on reception success or failure information for previously received data of the first D2D link.

16. A data reception method of a first device for D2D communication, comprising:
receiving subframe cycle information for initial transmission from a base station;
receiving activation reception assignment information for the D2D communication from the base station in a first subframe;
transmitting whether the activation reception assignment information has been successfully received to the base station in a second frame after a predetermined number (m) of subframes from the first subframe; and
receiving initial transmission data from the second device based on the activation reception assignment information and subframe cycle information for the initial transmission,
wherein, when a subframe in which an indicator of whether the initial transmission data has been successfully received is transmitted to the second device is a subframe for the initial transmission based on subframe cycle information for the initial transmission, the indicator of whether the initial transmission data has been successfully received is prevented from being transmitted to the second device.

17. The data transmission/reception method of claim 16, further comprising:
transmitting whether the initial transmission data received from the second device has been successfully received to the second device through a D2D link.

* * * * *